(12) United States Patent
Kaga et al.

(10) Patent No.: US 11,929,771 B2
(45) Date of Patent: Mar. 12, 2024

(54) TRANSMISSION SYSTEM, ANTENNA, CONTROL DEVICE, AND TRANSMISSION METHOD

(71) Applicant: Panasonic Intellectual Property Management Co., Ltd., Osaka (JP)

(72) Inventors: Satoshi Kaga, Ishikawa (JP); Toshihiro Nagayama, Ishikawa (JP); Hiroaki Kobayashi, Ishikawa (JP); Yasunori Komukai, Miyagi (JP); Shinichi Okada, Osaka (JP); Yasumichi Takai, Kanagawa (JP); Yoshinori Hiramatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 17/603,447

(22) PCT Filed: Apr. 16, 2020

(86) PCT No.: PCT/JP2020/016706
§ 371 (c)(1),
(2) Date: Oct. 13, 2021

(87) PCT Pub. No.: WO2020/213679
PCT Pub. Date: Oct. 22, 2020

(65) Prior Publication Data
US 2022/0209799 A1     Jun. 30, 2022

(30) Foreign Application Priority Data

Apr. 19, 2019  (JP) ................................. 2019-080196

(51) Int. Cl.
*H04B 3/00*   (2006.01)
*H04B 1/04*   (2006.01)
(Continued)

(52) U.S. Cl.
CPC ......... *H04B 1/0483* (2013.01); *H04B 7/0682* (2013.01); *H04L 25/49* (2013.01)

(58) Field of Classification Search
CPC ...... H04B 1/0483; H04B 7/0682; H04B 1/16; H04L 25/49
(Continued)

(56) References Cited

U.S. PATENT DOCUMENTS

| | | |
|---|---|---|
| 2005/0184154 A1 | 8/2005 | Tanaka et al. |
| 2009/0159113 A1 | 6/2009 | Morimoto |
| 2017/0099608 A1* | 4/2017 | Lam ......................... H04B 1/16 |

FOREIGN PATENT DOCUMENTS

| | | |
|---|---|---|
| JP | 2003-319693 | 11/2003 |
| JP | 2005-244445 | 9/2005 |

(Continued)

OTHER PUBLICATIONS

International Search Report (ISR) dated Jul. 7, 2020 in International (PCT) Application No. PCT/JP2020/016706.

*Primary Examiner* — Phuong Phu
(74) *Attorney, Agent, or Firm* — Wenderoth, Lind & Ponack, L.L.P.

(57) ABSTRACT

A transmission system includes: an antenna; a control device including an RF circuit which transmits a first signal for controlling a radio wave to be outputted from the antenna and an external power supply which supplies direct current to the antenna; and a first transmission path which connects the antenna and the control device, and is used in transmission of the first signal and supplying of the direct current to the antenna.

15 Claims, 14 Drawing Sheets

(51) Int. Cl.
*H04B 7/06* (2006.01)
*H04L 25/00* (2006.01)
*H04L 25/49* (2006.01)

(58) Field of Classification Search
USPC .................................................. 375/257, 258
See application file for complete search history.

(56) References Cited

FOREIGN PATENT DOCUMENTS

| | | |
|---|---|---|
| JP | 2010-41599 | 2/2010 |
| JP | 2010-102530 | 5/2010 |
| JP | 5137820 | 2/2013 |
| JP | 2016-120035 | 7/2016 |
| JP | 6443921 | 12/2018 |
| WO | 2007/125867 | 11/2007 |

\* cited by examiner

TRANSMISSION SYSTEM, ANTENNA, CONTROL DEVICE, AND TRANSMISSION METHOD

TECHNICAL FIELD

The present disclosure relates to a transmission system, an antenna and a control device which are used in the transmission system, and a transmission method.

BACKGROUND ART

Patent Literature 1 discloses a system including an antenna which receives a signal from a radio frequency identifier (RFID) tag and a control device for controlling the antenna (RFID reader) (e.g., Patent Literature 1).

CITATION LIST

Patent Literature

[PTL 1] Japanese Unexamined Patent Application Publication No. 2010-102530

SUMMARY OF INVENTION

Technical Problem

For example, between the antenna and the control device, a plurality of wires are needed including a power supply line which supplies power to the antenna and a transmission line for transmitting a wireless signal, which raises a problem in that a system including the antenna and the control device tends to have a large size and to be high in cost.

Hence, the present disclosure provides a transmission system and the like which allow reduction in size and cost of the transmission system.

Solution to Problem

A transmission system according to an aspect of the present disclosure includes: an antenna; a control device including a radio wave controller which transmits a first signal for controlling a radio wave to be outputted from the antenna and a direct current power supply which supplies direct current to the antenna; and a first transmission path which connects the antenna and the control device, and is used in transmission of the first signal to the antenna and supplying of the direct current to the antenna.

It should be noted that these generic and specific aspects may be implemented as a system, a device, a method, a recording medium, or a computer program, or may be implemented as any combination of a system, a device, a method, a recording medium, and a computer program.

Advantageous Effects of Invention

A transmission system, and the like, according to the present disclosure allows reduction in size and cost of the transmission system.

DESCRIPTION OF EMBODIMENTS

Figure 1:
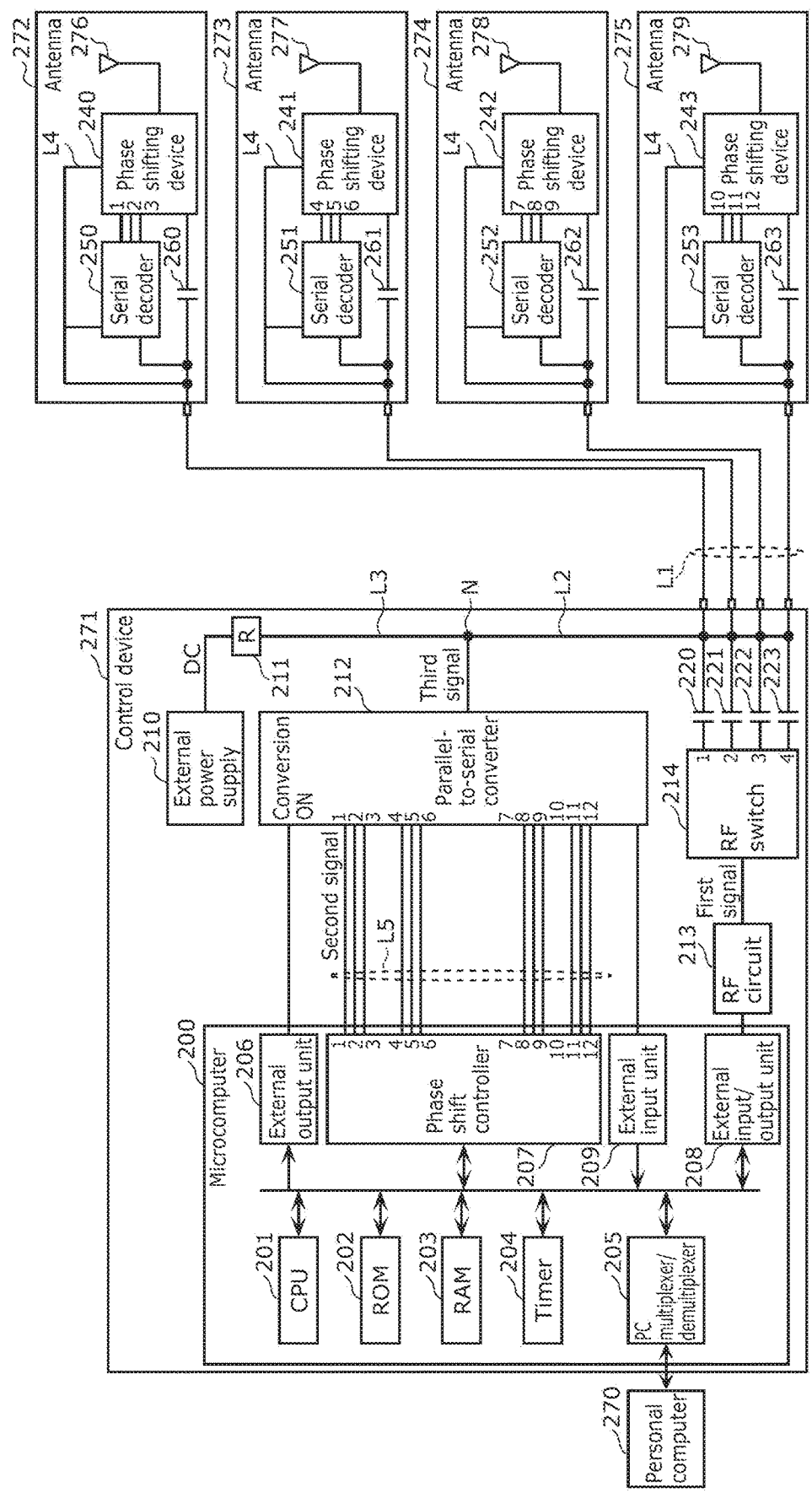
FIG. 1 is a configuration diagram illustrating an example of a transmission system according to Embodiment 1.

A transmission system according to the present disclosure includes: an antenna; a control device including a radio wave controller which transmits a first signal for controlling a radio wave to be outputted from the antenna and a direct current power supply which supplies direct current to the antenna; and a first transmission path which connects the antenna and the control device, and is used in transmission of the first signal to the antenna and supplying of the direct current to the antenna.

Accordingly, the transmission path for transmitting the first signal and the power supply line for supplying the direct current are not provided separately, and the transmission of the first signal and the supplying of the direct current are performed using one first transmission path, so that the transmission system can be reduced in size and cost.

Furthermore, the transmission system may further include: a first switch which controls the transmission of the first signal by the first transmission path; and a capacitor which blocks the direct current from the first transmission path to the first switch.

Accordingly, for example, in a case where the first transmission paths are used to transmit a signal other than the first signal to the antennas, by controlling the first switches, it is possible to preclude the first signal from being transmitted to the first transmission paths while the signal other than the first signal is transmitted to an antenna. In addition, with the capacitors which block the direct current, it is possible to prevent the direct current flowing through the first transmission paths from flowing into the first switches and into the radio wave controller via the first switches.

Furthermore, the control device may further include: a phase shift controller which performs parallel transmission of a second signal for controlling phase shifting of a radio wave to be outputted by the antenna; and a converter which converts the second signal that has been parallel transmitted into a third signal. The first transmission path may also be used in transmission of the third signal to the antenna.

For example, in order to transmit the second signal which has been parallel transmitted to antennas as it is, it is necessary to provide transmission paths by the number of the antennas for parallel transmission between the antennas and the control device, which leads to an increase in size and cost of the transmission system. In contrast to this, the second signal which has been parallel transmitted is converted into the third signal, which is in a form allowing transmission by one first transmission path, so that the transmission of the first signal, the supplying of the direct current, and the transmission of the third signal are performed using one first transmission path. It is therefore possible to perform phase shifting of a radio wave outputted from an antenna while the transmission system is reduced in size and cost.

Furthermore, the transmission system may include a plurality of antennas and a plurality of first transmission paths, each of the plurality of antennas being the antenna, each of the plurality of first transmission paths being the first transmission path. The first signal may be a signal for controlling radio waves to be outputted from the plurality of antennas, the second signal may be a signal for controlling phase shifting of the radio waves to be outputted by the plurality of antennas, and the direct current power supply may supply the direct current to the plurality of antennas.

Accordingly, reduction in size and cost of a transmission system including a plurality of antennas becomes possible.

Furthermore, the transmission system may further include a plurality of first switches which control transmission of the first signal by the plurality of first transmission paths. The control device may further include a pairing process unit which, when transmission of the first signal is being controlled by one first switch among the plurality of first switches, pairs the one first switch and an antenna having a received signal strength indication greater than or equal to a predetermined threshold among the plurality of antennas.

For example, in a case where the transmission system controls the plurality of antennas individually, it may be necessary to recognize which of the antennas is connected to which first switch among a plurality of first switches. For example, it is conceivable to check a connection relationship manually, but the check is troublesome. Hence, when transmission of the first signal is being controlled by one first switch among the plurality of first switches, the one first switch is automatically paired with an antenna having a received signal strength indication greater than or equal to the predetermined threshold among the plurality of antennas. This is because the antenna having a received signal strength indication greater than or equal to the predetermined threshold is an antenna to which the first signal is transmitted via the one first switch, and thus it is found that the antenna is connected to the one first switch. By similarly pairing each of the other first switches with an antenna which has a received signal strength indication greater than or equal to the predetermined threshold when transmission of the first signal is controlled by the corresponding one first switch, the plurality of antennas and the plurality of first switches can be paired with one another. In this way, the pairing of the plurality of antennas and the plurality of first switches can be easily performed.

Furthermore, the transmission system may further include: a second transmission path for transmitting the third signal obtained from the conversion by the converter to the first transmission path and supplying the direct current from the direct current power supply to the first transmission path; and a second switch provided in the second transmission path, for blocking the direct current.

Since the control device is a device which outputs the first signal for controlling radio waves to be outputted from the antennas, there may arise a problem when the control device is connected to a spectrum analyzer for measuring signal strength or connected to a network analyzer for impedance matching or the like and outputs direct current. Hence, by providing the second switch for blocking the direct current in the second transmission path between the direct current power supply and the first transmission paths, it is possible to control the second switch according to circumstances so as not to output the direct current from the control device.

Furthermore, the transmission system may further include: a second transmission path for transmitting the third signal obtained from the conversion by the converter to the first transmission path and supplying the direct current from the direct current power supply to the first transmission path; and an LC parallel resonance circuit provided in the second transmission path.

The first signal transmitted through the first transmission path may deteriorate under influence of the direct current from the direct current power supply or an impedance of the converter via the second transmission path. Hence, the LC parallel resonance circuit is provided in the second transmission path, and the LC parallel resonance circuit is configured to have a maximum impedance in a frequency band which used for the first signal. The direct current power supply or the converter is isolated when viewed from the first transmission path, so that the first signal can be restrained from deteriorating.

Furthermore, the transmission system may further include: a third transmission path for supplying the direct current from the direct current power supply to the second transmission path; and an adjusting circuit which is provided in the third transmission path and adjusts a value of the direct current supplied to the second transmission path.

In a case where a parasitic capacitance of each first transmission path is large or a case where an operation of increasing a load on the antennas is performed, the direct current to the antennas may become insufficient. Hence, by providing the adjusting circuit, the direct current supplied to the antennas can be adjusted, and thus it is possible to increase the direct current to the antennas when the direct current to the antennas becomes insufficient.

Furthermore, the converter may be a parallel-to-serial converter, and the third signal may be a serial signal.

Accordingly, by converting the second signal that has been parallel transmitted into the third signal being a serial signal, the third signal can be transmitted by one first transmission path.

Furthermore, the antenna may further include a serial decoder which re-converts the third signal transmitted by the first transmission path into a fourth signal for parallel transmission, and responds with an acknowledgment when the fourth signal is a signal for the antenna.

Accordingly, the third signal being a serial signal transmitted to the antenna can be re-converted by the antenna into the fourth signal for parallel transmission, which enables the phase shifting.

In addition, in a case where a plurality of antennas are provided, a phase of a radio wave can be shifted for a specific antenna by causing the antenna to transmit an acknowledgment (e.g., ACK).

Furthermore, the converter may be a parallel-to-pulse converter, and the third signal may be a pulse signal.

Accordingly, by converting the second signal that has been parallel transmitted into the third signal being a pulse signal, the third signal can be transmitted by one first transmission path.

Furthermore, the antenna may further include: a pulse counter which counts a total number of pulses of the third signal transmitted by the first transmission path; and a decoder which re-converts the third signal into a fourth signal for parallel transmission, based on the total number of pulses counted by the pulse counter, and responds with an acknowledgment when the fourth signal is a signal for the antenna.

Accordingly, the third signal being a pulse signal transmitted to the antenna can be re-converted by the antenna into the fourth signal for parallel transmission, which enables the phase shifting. In addition, in a case where a plurality of antennas are provided, a phase of a radio wave can be shifted for a specific antenna by causing the antenna to transmit an acknowledgment (e.g., ACK).

Furthermore, the transmission system may further include a control unit that instructs the antenna to output a radio wave when the acknowledgment is received within a predetermined time, and instructs the phase shift controller to send the second signal again when the acknowledgment is not received within the predetermined time.

Accordingly, it is possible to cause an antenna having transmitted the acknowledgment within the predetermined time to output a radio wave.

Furthermore, the antenna may further include: an output unit for outputting a radio wave; a fourth transmission path for extracting the direct current from the first transmission path and supplying the direct current to the output unit; and a blocking circuit disposed in the fourth transmission path, for blocking the direct current to be supplied to the output unit.

Accordingly, for example, in a case where there is a plurality of antennas, when the antennas each demand a high direct current, the demand may exceed a value of current which can be supplied by the direct current power supply. Hence, supplying of the direct current to output units of antennas being not in use is stopped according to circumstances, so that the direct current can be prevented from becoming insufficient.

Furthermore, the antenna may further include: an output unit for outputting a radio wave; and a capacitor which blocks the direct current from the first transmission path to the output unit.

Accordingly, since the direct current, as well as the first signal, flows through the first transmission path, the direct current is blocked by the capacitor on the antenna side, so that the first signal can be extracted.

An antenna according to the present disclosure is an antenna to be used in the above-described transmission system.

Accordingly, it is possible to provide an antenna that allows reduction in size and cost of a transmission system.

A control device according to the present disclosure is a control device to be used in the above-described transmission system.

Accordingly, it is possible to provide a control device that allows reduction in size and cost of a transmission system.

A transmission method according to the present disclosure is a transmission method used in a transmission system including an antenna and a control device including (i) a radio wave controller which transmits a first signal for controlling a radio wave to be outputted from the antenna and (ii) a direct current power supply which supplies direct current to the antenna. The transmission method includes performing transmission of the first signal to the antenna and supplying of the direct current to the antenna, using a first transmission path connecting the antenna and the control device.

Accordingly, it is possible to provide a transmission system that allows reduction in size and cost of a transmission system.

Each of the exemplary embodiments described below shows a generic or specific example of the present disclosure. Therefore, numerical values, shapes, structural components, the arrangement and connection of the structural components, steps, the processing order of the steps, etc., shown in the following exemplary embodiments are mere examples, and are not intended to limit the scope of the present disclosure.

[Embodiment 1]

Embodiment 1 will be described below with reference to FIG. 1 to FIG. 4.

FIG. 1 is a configuration diagram illustrating an example of transmission system 1 according to Embodiment 1.

Transmission system 1 is, for example, a system which reads a signal from an RFID tag and writes a signal to an RFID tag. For example, transmission system 1 is applied to an apparatus, a box, a warehouse, or the like where an item with an RFID tag attached thereto is placed. For example, transmission system 1 is applied to a refrigerator and used to identify an item placed in the refrigerator. Note that this does not limit the application of transmission system 1; the application is not limited to a particular application.

Transmission system 1 includes control device 271 for controlling antennas, the antenna, and first transmission paths L1 which connect the antennas and control device 271. Here, transmission system 1 includes a plurality of (e.g., four) antennas 272, 273, 274, and 275 and a plurality of (e.g., four) first transmission paths L1 to which the plurality of antennas 272, 273, 274, and 275 are connected in a one-to-one relationship. Hereinafter, what is referred to as an antenna means any one of the plurality of antennas 272, 273, 274, and 275. In a case where transmission system 1 is applied to a large apparatus or the like, transmission system 1 including the plurality of antennas 272, 273, 274, and 275 enables communication with an RFID tag using the plurality of antennas 272, 273, 274, and 275 wherever the RFID tag is disposed in the large apparatus. Note that the number of antennas included in transmission system 1 is not limited to a particular number. For example, transmission system 1 may include a single antenna; in this case, transmission system 1 may include a single first transmission path L1 connected to the single antenna.

Transmission system 1 may additionally include personal computer 270. Personal computer 270 is a computer which acquires a signal from an RFID tag from control device 271 and sends a signal to be written to the RFID tag. Personal computer 270 may be a server apparatus (one on the cloud, etc.) provided in a location other than the location where control device 271 is disposed. In this case, control device 271 may include a wireless communication circuit or the like. Note that transmission system 1 need not include personal computer 270, and control device 271 may have a function of personal computer 270.

Control device 271 includes microcomputer 200, external power supply 210, resistor 211, parallel-to-serial converter 212, radio frequency (RF) circuit 213, RF switch 214, capacitors 220 to 223, second transmission path L2, third transmission path L3, and fifth transmission paths L5.

Control device 271 is a device which is used in transmission system 1; for example, control device 271 is a device having a function of controlling the antennas to read a signal from an RFID tag and to write a signal to the RFID tag.

Microcomputer 200 is a processor (microprocessor) which controls parallel-to-serial converter 212, RF circuit 213, RF switch 214, and the like to implement reading of a signal from an RFID tag and writing of a signal to the RFID tag.

Microcomputer 200 includes CPU 201, read only memory (ROM) 202, random access memory (RAM) 203, timer 204, PC multiplexer/demultiplexer 205, external output unit 206, phase shift controller 207, external input/output unit 208, and external input unit 209.

CPU 201 is a device which plays a central role in microcomputer 200 to perform processing. ROM 202 and RAM 203 store programs, data, and the like. CPU 201 operates in accordance with the programs stored in ROM 202, RAM 203, or the like and with timings specific to timer 204, so as to control PC multiplexer/demultiplexer 205, external output unit 206, phase shift controller 207, external input/output unit 208, and external input unit 209.

PC multiplexer/demultiplexer 205 is an interface which connects personal computer 270 and control device 271; PC multiplexer/demultiplexer 205 inputs a signal from personal computer 270 into control device 271 and outputs a signal from control device 271 to personal computer 270.

External output unit 206 is an interface which outputs an instructing signal for converting a second signal that has been parallel transmitted into a third signal.

Phase shift controller 207 parallel transmits the second signal for controlling shifting of phases of radio waves to be outputted by the antennas (in other words, phase shift controller 207 outputs the second signal to a plurality of wires in parallel). Phase shift controller 207 is connected to parallel-to-serial converter 212 by fifth transmission paths L5, to which a signal for shifting phases of radio waves outputted from the antennas are transmitted. Specifically, the second signal to be parallel transmitted is transmitted to fifth transmission paths L5. For example, numbers "1 to 12" attached to each of phase shift controller 207 and parallel-to-serial converter 212 are terminal numbers. For example, a phase of a radio wave outputted by antenna 272 can be controlled with 3 bits of the second signal parallel transmitted between terminals "1 to 3" of phase shift controller 207 and parallel-to-serial converter 212 (i.e., the control is performed in eight different ways). Similarly, phases of radio waves outputted by antennas 273, 274, and 275 each can be controlled with 3 bits of the second signal parallel transmitted between terminals "4 to 6", terminals "7 to 9", and terminals "10 to 12" of phase shift controller 207 and parallel-to-serial converter 212, respectively.

External input/output unit 208 is an interface from which an instructing signal for outputting a first signal to RF circuit 213 is outputted and into which signals obtained from the antennas by RF circuit 213 are inputted.

External input unit 209 is an interface which receives an acknowledgment (e.g., ACK) from each antenna. For example, external input unit 209 is a control unit that instructs an antenna to output a radio wave when an acknowledgment is received within a predetermined time, and instructs phase shift controller 207 to send the second signal again when the acknowledgment is not received within the predetermined time. This enables an antenna having transmitted the acknowledgment within the predetermined time to output a radio wave.

External power supply 210 is a direct current power supply which supplies direct current to the antennas.

Resistor 211 is a pull-up resistor for pulling up first transmission paths L1.

Parallel-to-serial converter 212 is a converter which converts the second signal that has been parallel transmitted into a third signal. Parallel-to-serial converter 212 converts the second signal that has been parallel transmitted from phase shift controller 207 into the third signal, which is a serial signal, in response to an instructing signal from external output unit 206. By converting the second signal that has been parallel transmitted into the third signal being a serial signal, the third signal can be transmitted by one first transmission path L1.

Second transmission path L2 is a transmission path for transmitting the third signal that has been converted by parallel-to-serial converter 212 to first transmission path L1 and supplying the direct current from external power supply 210.

Third transmission path L3 is a transmission path for supplying the direct current from external power supply 210 to second transmission path L2. Resistor 211 is provided in third transmission path L3.

As illustrated in FIG. 1, the transmission path from external power supply 210 to first transmission paths L1 includes second transmission path L2 and third transmission path L3. When a branchpoint at which a transmission path to parallel-to-serial converter 212 branches off from the transmission path from external power supply 210 to first transmission paths L1 is denoted by node N, a transmission path which connects node N to first transmission paths L1 will be referred to as second transmission path L2, and a transmission path which connects node N and external power supply 210 will be referred to as third transmission path L3.

RF circuit 213 is a radio wave controller which transmits the first signal for controlling radio waves to be outputted from the antennas. That is, RF circuit 213 is a circuit that outputs a wireless signal.

RF switch 214 includes a first switch which controls transmission of the first signal by first transmission paths L1; the first switch is, for example, a switch for selecting one of the plurality of antennas 272 to 275 to which the first signal having been outputted from RF circuit 213 is to be transmitted. Here, RF switch 214 includes a plurality of first switches which controls transmission of the first signal by a plurality of first transmission paths L1. For example, RF switch 214 includes, as the plurality of first switches, a switch which switches connection between RF circuit 213 and first transmission path L1 connected to antenna 272, a switch which switches connection between RF circuit 213 and first transmission path L1 connected to antenna 273, a switch which switches connection between RF circuit 213 and first transmission path L1 connected to antenna 274, and a switch which switches connection between RF circuit 213 and first transmission path L1 connected to antenna 275. Note that RF switch 214 may be a single pole n throw (SPnT (n is an integer greater than or equal to two)) switch. For example, in a case where RF switch 214 is an SP4T switch, RF switch 214 has a common terminal connected to RF circuit 213 and has four selection terminals selectively connected to the plurality of first transmission paths L1. Also in this case, when a set of the common terminal and one of the four selection terminals is regarded as a first switch, it can be said that RF switch 214 includes a plurality of (four) first switches. In a case where first transmission paths L1 are used to transmit a signal other than the first signal (e.g., third signal) to the antennas, by controlling the first switches, it is possible to preclude the first signal from being transmitted to first transmission paths L1 while the third signal is transmitted to an antenna. In addition, by controlling the plurality of first switches, it is possible to transmit the first signal to a specified one of the plurality of antennas 272 to 275.

Capacitors 220 to 223 are direct-current blocking capacitors which block the direct current from first transmission paths L1 to RF switch 214 (the first switches). With capacitors 220 to 223 which block the direct current, it is possible to prevent the direct current flowing through first transmission paths L1 from flowing into RF switch 214 (the first switches) and into RF circuit 213 via RF switch 214 (the first switches).

First transmission paths L1 are each one of transmission paths used for transmission of the first signal and supplying of the direct current to the antennas. For example, first transmission paths L1 are coaxial lines (coaxial cables). First transmission paths L1 are also used for transmission of the third signal to the antennas. Here, transmission system 1 includes a plurality of (specifically, four) sets of an antenna and first transmission path L1. In a case where transmission system 1 includes a plurality of sets of an antenna and first transmission path L1, the first signal serves as a signal for controlling radio waves outputted from the plurality of antennas, the second signal serves as a signal for controlling shifting of phases of the radio waves outputted from the plurality of antennas, and external power supply 210 supplies the direct current to the plurality of antennas.

The plurality of antennas 272 to 275 each has the following configuration. Here, description will be made with attention paid to antenna 272. Antennas 273 to 275 have the same basic configuration as antenna 272, and thus detailed description will be omitted for antennas 273 to 275.

Antenna 272 is an antenna used in transmission system 1; antenna 272 is, for example, an antenna which receives a signal from an RFID tag and transmits a signal to the RFID tag. Antenna 272 includes phase shifting device 240, serial decoder 250, capacitor 260, antenna element 276, and fourth transmission path L4.

Antenna element 276 is, for example a pattern antenna element or the like provided on a board or the like.

Phase shifting device 240 is an output unit for outputting a radio wave with a phase being shifted.

Phase shifting device 240 and antenna element 276 will be described later in detail.

Serial decoder 250 is a decoder which re-converts the third signal transmitted by first transmission path L1 into a fourth signal for parallel transmission. In a case where the fourth signal is a signal for antenna 272, serial decoder 250 sends an ACK. For example, terminals "1 to 3" of phase shifting device 240 correspond to terminals "1 to 3" of each of phase shift controller 207 and parallel-to-serial converter 212. Specifically, parallel-to-serial converter 212 converts the second signal that has been parallel transmitted between terminals "1 to 3" of phase shift controller 207 and parallel-to-serial converter 212 into the third signal, adds a signal indicating that a destination of the third signal is antenna 272 to the third signal, and transmits the third signal to first transmission paths L1. The third signal is transmitted via the plurality of first transmission paths L1 to antennas 272 to 275. Serial decoder 250 re-converts the third signal into the fourth signal for parallel transmission to phase shifting device 240 and parallel transmits the fourth signal to terminals "1 to 3" of phase shifting device 240, as with the second signal which is outputted from terminals "1 to 3" of phase shift controller 207. As described above, since the third signal is a signal directed to antenna 272 including serial decoder 250, serial decoder 250 returns ACK to control device 271. Serial decoders 251 to 253 re-convert the third signal into the fourth signal, recognize that the third signal is not directed to themselves, and do not parallel transmit the fourth signal to respective phase shifting devices but discard the fourth signal. Serial decoder 250 then parallel transmits the fourth signal to phase shifting device 240 to control phase shifting by phase shifting device 240. In this way, the third signal being a serial signal transmitted to the antenna can be re-converted by the antenna into the fourth signal for parallel transmission, which enables the phase shifting. In addition, in a case where a plurality of antennas are provided, a phase of a radio wave can be shifted for a specific antenna by causing the antenna to transmit an acknowledgment (e.g., ACK).

Capacitor 260 is a direct-current blocking capacitor which blocks the direct current from first transmission path L1 to phase shifting device 240. Since the direct current, as well as the first signal, flows through first transmission path L1, the direct current is blocked by capacitor 260 on antenna 272 side, so that the first signal can be retrieved.

Fourth transmission path L4 is a transmission path for extracting the direct current from first transmission path L1 and supplying the direct current to phase shifting device 240. The direct current is also supplied to serial decoder 250 via fourth transmission path L4.

Next, phase shifting device 240 and antenna element 276 will be described in detail with reference to FIG. 2.

Figure 2:
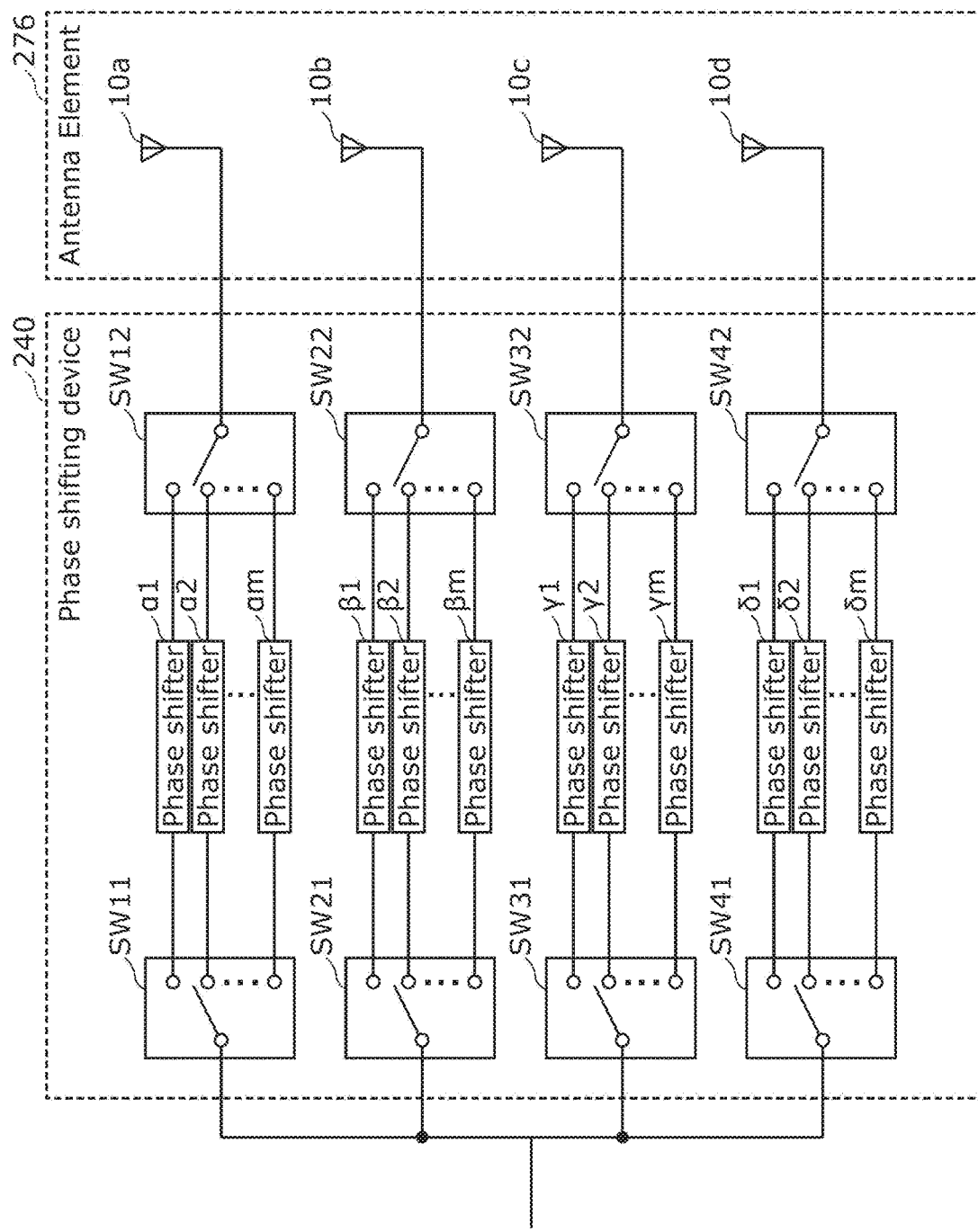
FIG. 2 is a configuration diagram illustrating an example of a phase shifting device and an antenna element according to Embodiment 1.

FIG. 2 is a configuration diagram illustrating an example of phase shifting device 240 and antenna element 276 according to Embodiment 1.

Antenna element 276 includes a plurality of antenna elements which form an antenna array; here, antenna element 276 includes antenna elements 10a to 10d. For example, by making phase differences among first signals transmitted to antenna elements 10a to 10d, a directivity of antenna 272 can be controlled. That is, for example, this makes it possible to receive a signal from an RFID tag disposed in a certain direction with respect to antenna 272.

Phase shifting device 240 has a configuration for controlling the directivity of antenna 272; phase shifting device 240 includes switches SW11 and SW12 and phase shifters $\alpha 1$ to $\alpha m$ (m is an integer greater than or equal to 2) which are provided corresponding to antenna element 10a, switches SW21 and SW22 and phase shifters $\beta 1$ to $\beta m$ which are provided corresponding to antenna element 10b, switches SW31 and SW32 and phase shifters $\gamma 1$ to $\gamma m$ which are provided corresponding to antenna element 10c, and switches SW41 and SW42 and phase shifters $\delta 1$ to $\delta m$ which are provided corresponding to antenna element 10d.

Switch SW11 is an SPmT switch; switch SW11 has a common terminal connected to first transmission path L1 and selection terminals connected to phase shifters $\alpha 1$ to $\alpha m$. Switch SW21 is an SPmT switch; switch SW21 has a common terminal connected to first transmission path L1 and selection terminals connected to phase shifters $\beta 1$ to $\beta m$. Switch SW31 is an SPmT switch; switch SW31 has a common terminal connected to first transmission path L1 and selection terminals connected to phase shifters $\gamma 1$ to $\gamma m$. Switch SW41 is an SPmT switch; the switch SW41 has a common terminal connected to first transmission path L1 and selection terminals connected to phase shifters $\delta 1$ to $\delta m$.

Phase shifters $\alpha 1$ to $\alpha m$, $\beta 1$ to $\beta m$, $\gamma 1$ to $\gamma m$, and $\delta 1$ to $\delta m$ are phase adjusting circuits. Phase shifters $\alpha 1$ to $\alpha m$, $\beta 1$ to $\beta m$, $\gamma 1$ to $\gamma m$, and $\delta 1$ to $\delta m$ are each, for example, a circuit which includes impedance elements such as an inductor and a capacitor, and an adjustment amount of a phase is determined by a connection topology and element parameters of the impedance elements.

Switch SW12 is an SPmT switch; switch SW12 has a common terminal connected to antenna element 10a and selection terminals connected to phase shifters α1 to αm. Switch SW22 is an SPmT switch; switch SW22 has a common terminal connected to antenna element 10b and selection terminals connected to phase shifters β1 to βm. Switch SW32 is an SPmT switch; switch SW32 has a common terminal connected to antenna element 10c and selection terminals connected to phase shifters γ1 to γm. Switch SW42 is an SPmT switch; switch SW42 has a common terminal connected to antenna element 10d and selection terminals connected to phase shifters δ1 to δm.

The switches are controlled in accordance with the fourth signal parallel transmitted from serial decoder 250. That is, controlling each switch makes it possible to control which of the phase shifters the first signal from first transmission path L1 is to pass through; that is, an adjustment amount of a phase of the first signal can be determined correspondingly to a phase shifter through which the first signal is to pass. The phases of the first signals to be transmitted to antenna elements 10a to 10d forming the antenna array can be thereby shifted from one another, so that the directivity of antenna 272 can be controlled.

Here, a configuration example of phase shifting device 240 will be described in more detail with reference to FIG. 3, in which attention is paid to switch SW11, phase shifters α1 to αm, and switch SW12.

Figure 3:
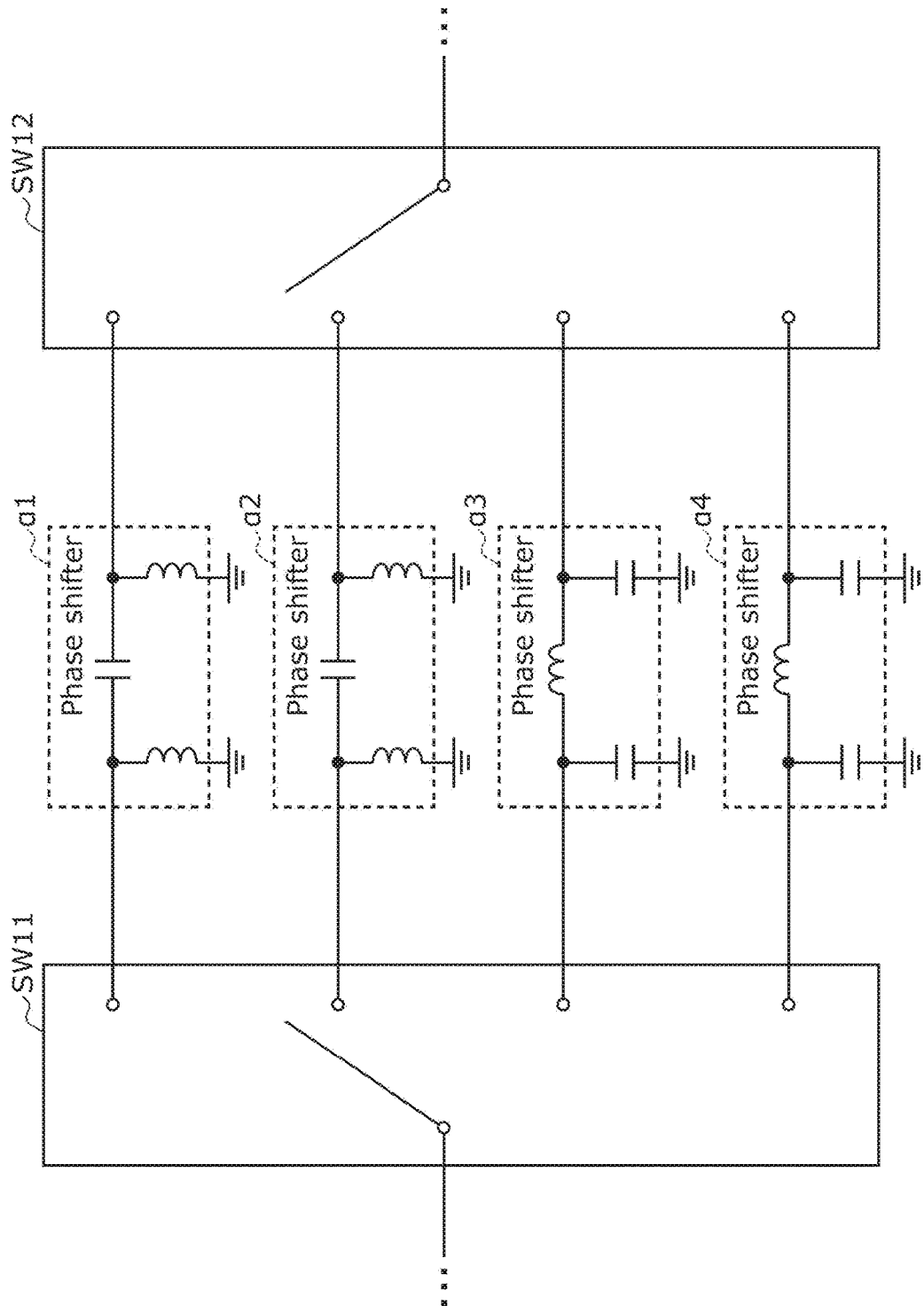
FIG. 3 is a configuration diagram illustrating an example of a part of the phase shifting device according to Embodiment 1.

FIG. 3 is a configuration diagram illustrating an example of a part of phase shifting device 240 according to Embodiment 1. It is assumed in FIG. 3 that switch SW11 and switch SW21 are SP4T switches, and FIG. 3 illustrates phase shifters α1 to α4 (i.e., m=4).

As illustrated in FIG. 3, phase shifters α1 to α4 are each implemented in a form of a π-shaped LC circuit. Note that the number and a connection topology of inductors and capacitors are not limited to those illustrated in FIG. 3.

Switch SW11 and switch SW12 are controlled in accordance with the fourth signal which has been parallel transmitted. For example, in a case where an adjustment amount of a phase of a first signal transmitted to antenna element 10a is determined in accordance with phase shifter al, switch SW11 and switch SW12 are controlled such that common terminals of switch SW11 and switch SW12 are connected to uppermost ones of selection terminals of switch SW11 and switch SW12 illustrated in FIG. 3.

In this way, the second signal which has been parallel transmitted from phase shift controller 207 is converted into the third signal being a serial signal, and the third signal is transmitted to the antennas. Each serial decoder re-converts the third signal into the fourth signal and parallel transmits the fourth signal directed to itself to the corresponding phase shifting device. Each phase shifting device adjusts phases of first signals transmitted to the corresponding antenna elements forming an antenna array such that the corresponding antenna has a desired directivity in accordance with the fourth signal.

Next, operation of control device 271 will be described with reference to FIG. 4.

Figure 4:
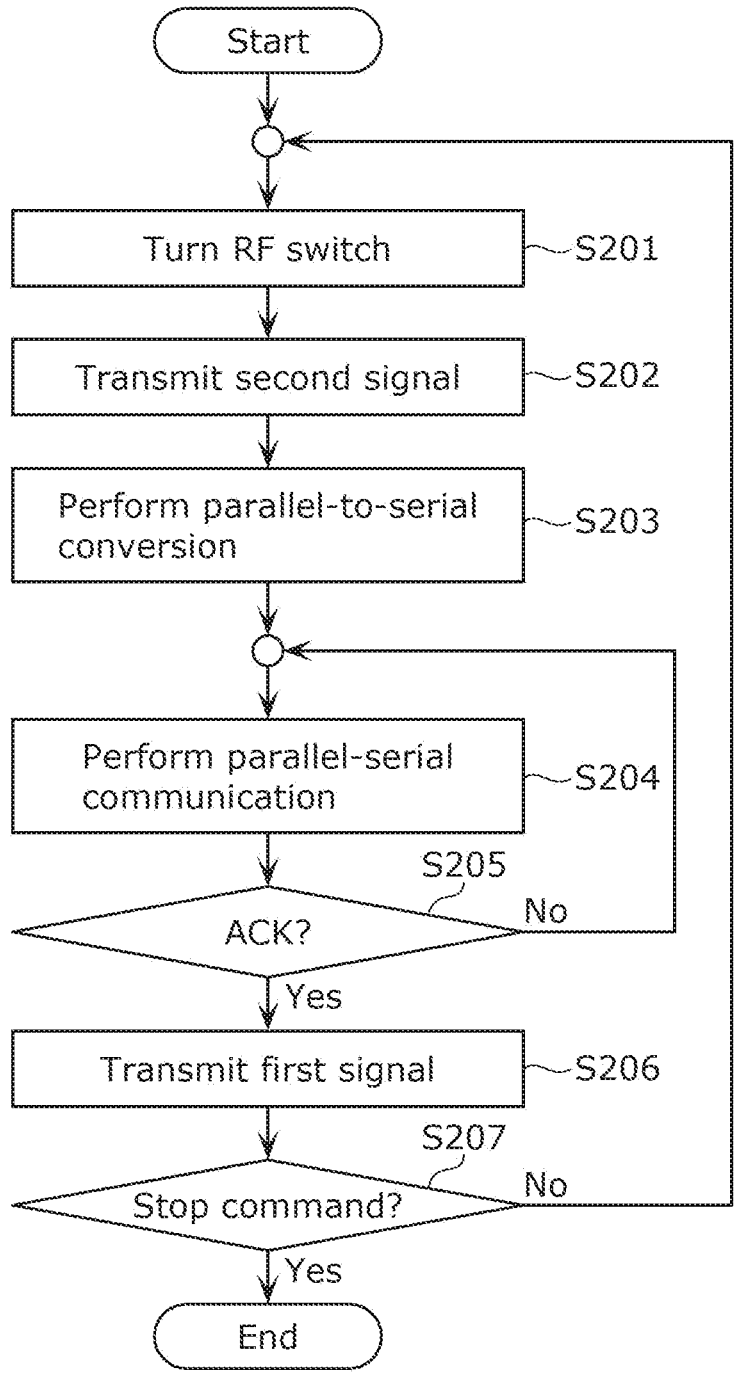
FIG. 4 is a flowchart illustrating an example of the operation of a control device according to Embodiment 1.

FIG. 4 is a flowchart illustrating an example of the operation of control device 271 according to Embodiment 1.

Control device 271 turns RF switch 214 (step S201). For example, to transmit the first signal to antenna 272, control device 271 controls RF switch 214 in such a manner as to connect RF circuit 213 to antenna 272 and not to connect RF circuit 213 to the other antennas.

Control device 271 parallel transmits the second signal (step S202). For example, terminals "1 to 3" of each of phase shift controller 207 and parallel-to-serial converter 212 are terminals which are paired with antenna 272, and control device 271 uses terminals "1 to 3" to parallel transmit the second signal for phase controlling of a radio wave to be outputted from antenna 272.

Control device 271 performs parallel-to-serial conversion from the second signal which has been parallel transmitted into the third signal being a serial signal (step S203). For example, since the second signal which has been parallel transmitted is a signal transmitted from terminals "1 to 3", which are paired with antenna 272, control device 271 treats the third signal as being directed to antenna 272.

Control device 271 transmits the third signal to the antennas, performing parallel communication processing (step S204).

For example, since the third signal is directed to antenna 272, control device 271 determines whether there is ACK from antenna 272 (step S205).

In a case where there is no ACK from antenna 272 (No in step S205), control device 271 performs step S204 again after a wait of a predetermined time or the like, for example.

In a case where there is ACK from antenna 272 (Yes in step S205), control device 271 transmits the first signal (step S206). Specifically, since RF circuit 213 is connected to antenna 272 by RF switch 214, the first signal is transmitted to antenna 272. In antenna 272, first signals with phases adjusted in accordance with the fourth signal are transmitted to the antenna elements, and a radio wave with a directivity adjusted is radiated from antenna 272.

Control device 271 then determines whether a stop command to stop the processing has been received from, for example, personal computer 270 or the like (step S207).

In a case where control device 271 has not received the stop command (No in step S207), control device 271 performs processing again from step S201. For example, control device 271 turns RF switch 214 and performs the same processing on an antenna other than antenna 272.

In a case where control device 271 receives the stop command (Yes in step S207), control device 271 ends the processing.

As described above, the transmission path for transmitting the first signal and the power supply line for supplying the direct current are not provided separately, and the transmission of the first signal and the supplying of the direct current are performed using one first transmission path L1, so that transmission system 1 can be reduced in size and cost. The present disclosure is also applicable to transmission system 1 including a plurality of antennas, so that transmission system 1 including the plurality of antennas 272 to 275 can be reduced in size and cost.

In addition, for example, in order to transmit the second signal which has been parallel transmitted to antennas as it is, it is necessary to provide transmission paths by the number of the antennas for parallel transmission between the antennas and control device 271, which leads to increase in size and cost of the transmission system. For example, as illustrated in FIG. 1, in order to perform 3-bit phase controlling on each of 4 antennas 272 to 275, transmission paths are additionally needed for the phase controlling. In contrast to this, the second signal which has been parallel transmitted is converted into the third signal, which is in a form allowing transmission by one first transmission path L1, so that the transmission of the first signal, the supplying of the direct current, and the transmission of the third signal are performed using one first transmission path L1. It is therefore possible to shift a phase of a radio wave outputted from an antenna while transmission system 1 is reduced in size and cost.

[Embodiment 2]

Embodiment 2 will be described below with reference to FIG. 5 and FIG. 6.

Figure 5:
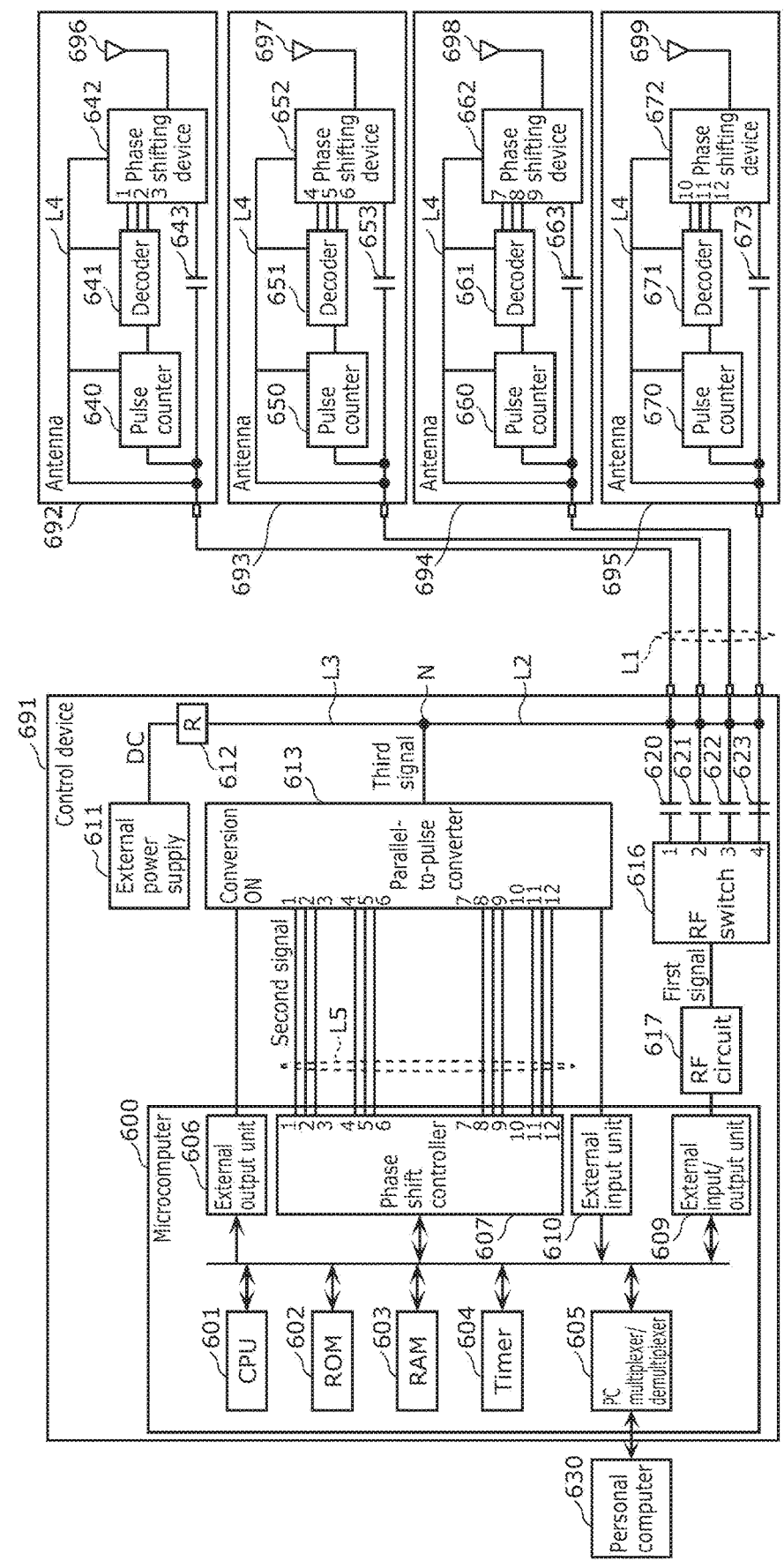
FIG. 5 is a configuration diagram illustrating an example of a transmission system according to Embodiment 2.

FIG. 5 is a configuration diagram illustrating an example of transmission system 2 according to Embodiment 2.

Transmission system 2 is different from transmission system 1 in Embodiment 1 in that transmission system 2 includes parallel-to-pulse converter 613 in place of parallel-to-serial converter 212 and includes pulse counters 640, 650, 660, and 670 and decoders 641, 651, 661, and 671 in place of serial decoders 250, 251, 252, and 253. In other respects, transmission system 2 is basically the same as transmission system 1 in Embodiment 1, and thus the other respects will be omitted.

Parallel-to-pulse converter 613 is a converter which converts a second signal that has been parallel transmitted into a third signal.

Parallel-to-pulse converter 613 converts the second signal that has been parallel transmitted from phase shift controller 607 into the third signal, which is a pulse signal, in response to an instructing signal from external output unit 606. For example, parallel-to-pulse converter 613 converts the second signal that has been parallel transmitted into the third signal whose number of pulses is based on a predetermined rule or the like. For example, for a 3-bit second signal, eight types of numbers of pulses are determined in advance. In this way, by converting the second signal that has been parallel transmitted into the third signal being a pulse signal, the third signal can be transmitted by one first transmission path L1.

The antennas in the present embodiment will be described with attention paid to antenna 692 of antennas 692 to 695. Antennas 693 to 695 have the same basic configuration as antenna 692, and thus detailed description will be omitted for antennas 693 to 695.

In contrast to antenna 272 in Embodiment 1, antenna 692 includes pulse counter 640 and decoder 641 in place of serial decoder 250.

Pulse counter 640 is a circuit which counts the number of pulses of the third signal transmitted by first transmission path L1. Note that pulse counter 640 is set to a specified count value when the power supply is turned on.

Based on the number of pulses counted by pulse counter 640, decoder 641 re-converts the third signal into a fourth signal for parallel transmission. Specifically, decoder 641 re-converts the third signal into the fourth signal in accordance with the predetermined rule or the like which is used when parallel-to-pulse converter 613 converts the second signal into the third signal. In addition, in a case where the fourth signal is a signal for antenna 692, decoder 641 responds with an acknowledgment. For example, terminals "1 to 3" of phase shifting device 642 correspond to terminals "1 to 3" of each of phase shift controller 607 and parallel-to-pulse converter 613. For example, based on a preset determination that a third signal whose number of pulses is any one of one to eight is a signal directed to antenna 692, decoder 641 re-converts the third signal into the fourth signal, recognizes that the number of pulses is any one of one to eight (i.e., recognizes that the fourth signal is directed to itself), and returns ACK to control device 691. Decoder 641 then parallel transmits the fourth signal to phase shifting device 642 to control phase shifting by phase shifting device 642. In this way, the third signal being a pulse signal transmitted to the antenna can be re-converted by the antenna into the fourth signal for parallel transmission, which enables the phase shifting. In addition, in a case where a plurality of antennas are provided, a phase of a radio wave can be shifted for a specific antenna by causing the antenna to transmit an acknowledgment (e.g., ACK).

Next, operation of control device 691 will be described with reference to FIG. 6.

Figure 6:
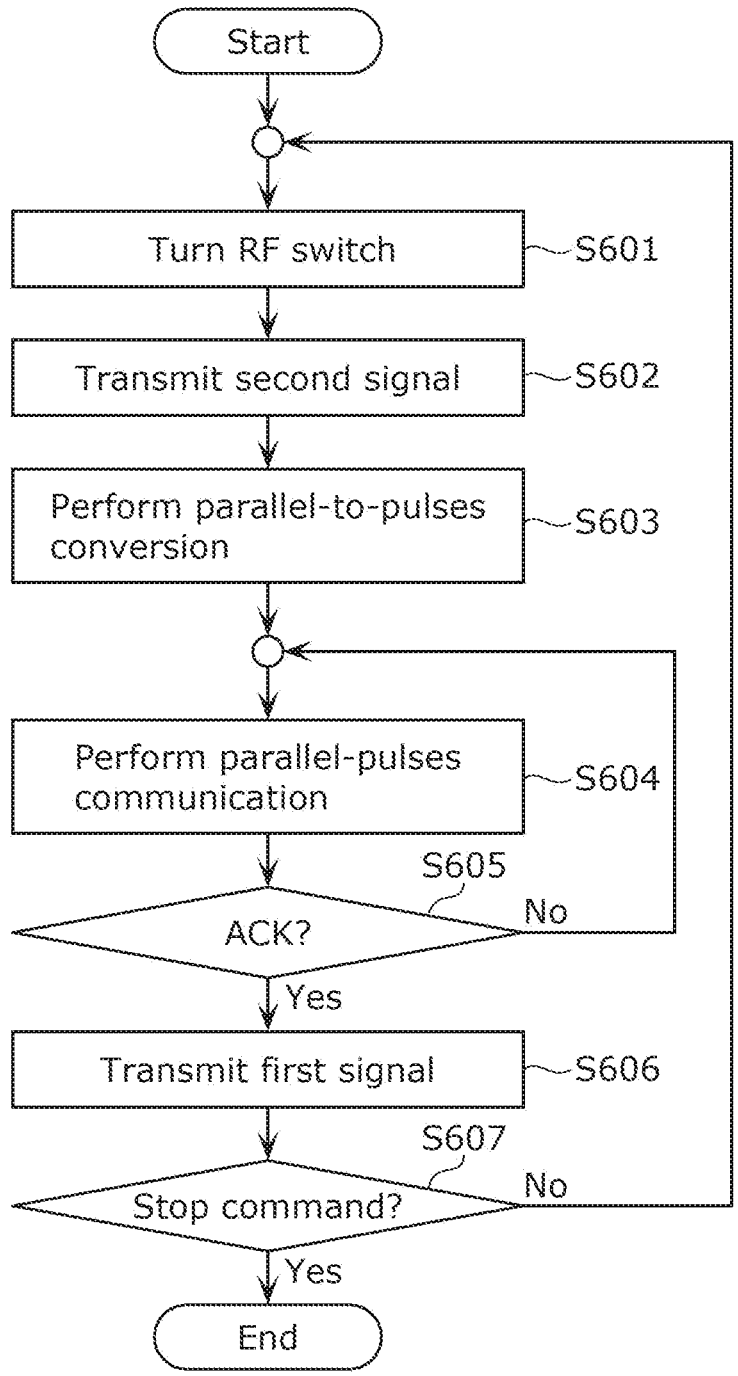
FIG. 6 is a flowchart illustrating an example of the operation of a control device according to Embodiment 2.

FIG. 6 is a flowchart illustrating an example of the operation of control device 691 according to Embodiment 2.

Control device 691 turns RF switch 616 (step S601). For example, to transmit the first signal to antenna 692, control device 691 controls RF switch 616 in such a manner as to connect RF circuit 617 to antenna 692 and not to connect RF circuit 617 to the other antennas.

Control device 691 parallel transmits the second signal (step S602). For example, terminals "1 to 3" of each of phase shift controller 607 and parallel-to-pulse converter 613 are terminals which are paired with antenna 692, and control device 691 uses terminals "1 to 3" to parallel transmit the second signal for phase controlling of a radio wave to be outputted from antenna 692.

Control device 691 performs parallel-to-pulses conversion from the second signal which has been parallel transmitted into the third signal being a pulse signal (step S603). For example, since the second signal which has been parallel transmitted is a signal transmitted from terminals "1 to 3", which are paired with antenna 692, control device 691 makes the third signal whose number of pulses indicates antenna 692.

Control device 691 transmits the third signal to the antennas, performing parallel-pulses communication processing (step S604).

For example, since the third signal is directed to antenna 692, control device 691 determines whether there is ACK from antenna 692 (step S605).

In a case where there is no ACK from antenna 692 (No in step S605), control device 691 performs step S604 again after a wait of a predetermined time or the like, for example.

In a case where there is ACK from antenna 692 (Yes in step S605), control device 691 transmits the first signal (step S606). Specifically, since RF circuit 617 is connected to antenna 692 by RF switch 616, the first signal is transmitted to antenna 692. In antenna 692, first signals with phases adjusted in accordance with the fourth signal are transmitted to the antenna elements, and a radio wave with a directivity adjusted is radiated from antenna 692.

Control device 691 then determines whether a stop command to stop the processing has been received from, for example, personal computer 630 or the like (step S607).

In a case where control device 691 has not received the stop command (No in step S607), control device 691 performs processing again from step S601. For example, control device 691 turns RF switch 616 and performs the same processing on an antenna other than antenna 692.

In a case where control device 691 receives the stop command (Yes in step S607), control device 691 ends the processing.

As seen from the above, since the pulse signal can be transmitted by one first transmission path L1, a pulse signal may be used in place of a serial signal.

Note that the following embodiments will be described by way of examples in which a serial signal is used for phase controlling, but the following embodiments are also applicable to a case where a pulse signal is used for phase controlling.

[Embodiment 3]

Embodiment 3 will be described below with reference to FIG. 7.

Figure 7:
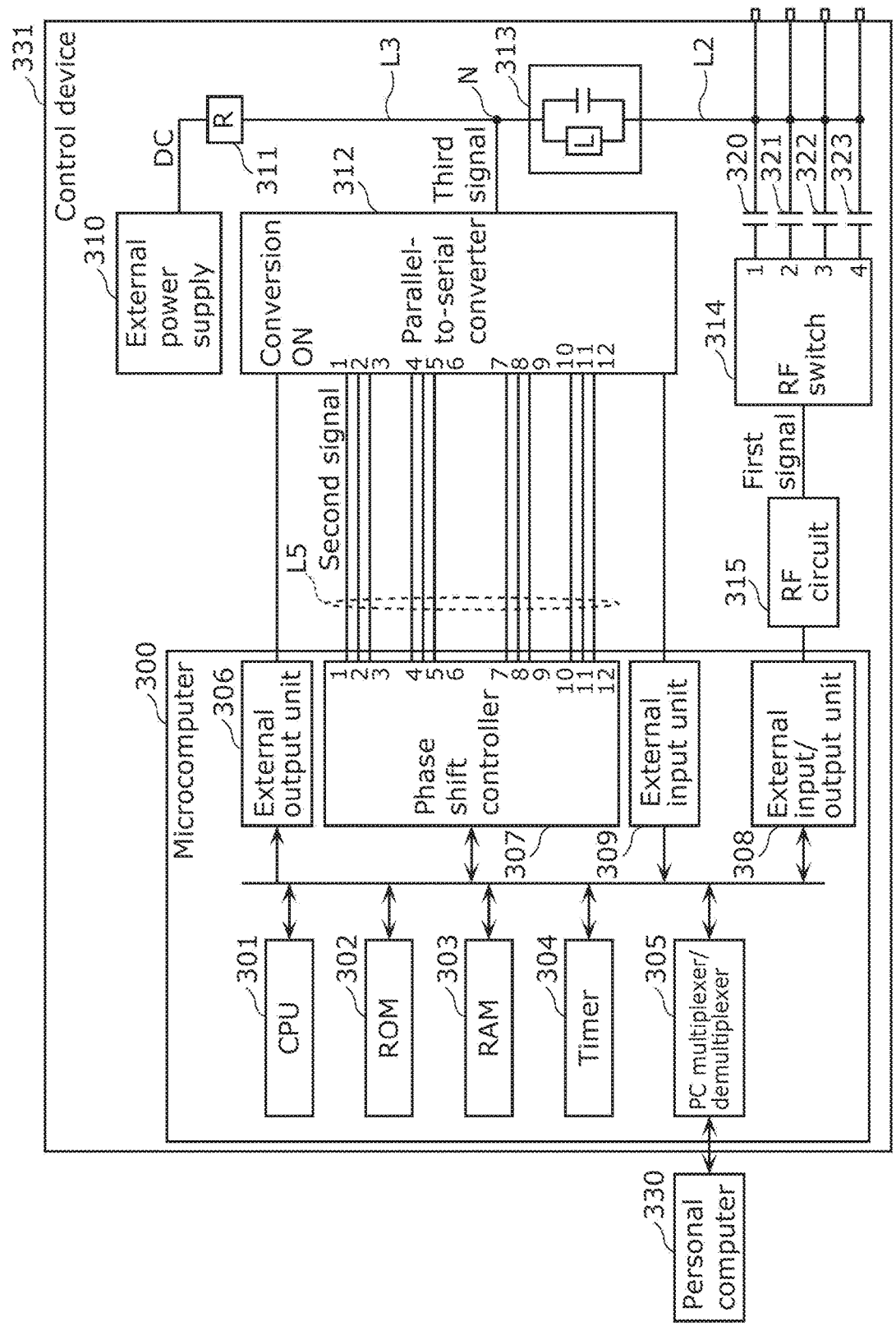
FIG. 7 is a configuration diagram illustrating an example of a control device according to Embodiment 3.

FIG. 7 is a configuration diagram illustrating an example of control device 331 according to Embodiment 3.

Control device 331 is different from control device 271 in Embodiment 1 in that control device 331 further includes LC parallel resonance circuit 313. In other respects, control device 331 is basically the same as control device 271 in Embodiment 1, and thus the other respects will be omitted.

LC parallel resonance circuit 313 is provided in second transmission path L2, LC parallel resonance circuit 313 includes, for example, an inductor and a capacitor which are connected in parallel to each other. LC parallel resonance circuit 313 serves as, for example, a filter which attenuates a signal in a specific frequency band. A first signal transmitted through first transmission path L1 is, for example, a wireless signal in an ultrahigh frequency (UHF) band, and the first signal may deteriorate under influence of direct current from external power supply 310 or an impedance of parallel-to-serial converter 312 via second transmission path L2. Hence, LC parallel resonance circuit 313 is provided in second transmission path L2, and LC parallel resonance circuit 313 is configured to have a maximum impedance in a frequency band which is used for the first signal. External power supply 310 or parallel-to-serial converter 312 is thus isolated when viewed from first transmission path L1, so that the first signal can be restrained from deteriorating.

[Embodiment 4]

Embodiment 4 will be described below with reference to FIG. 8 and FIG. 9.

Figure 8:
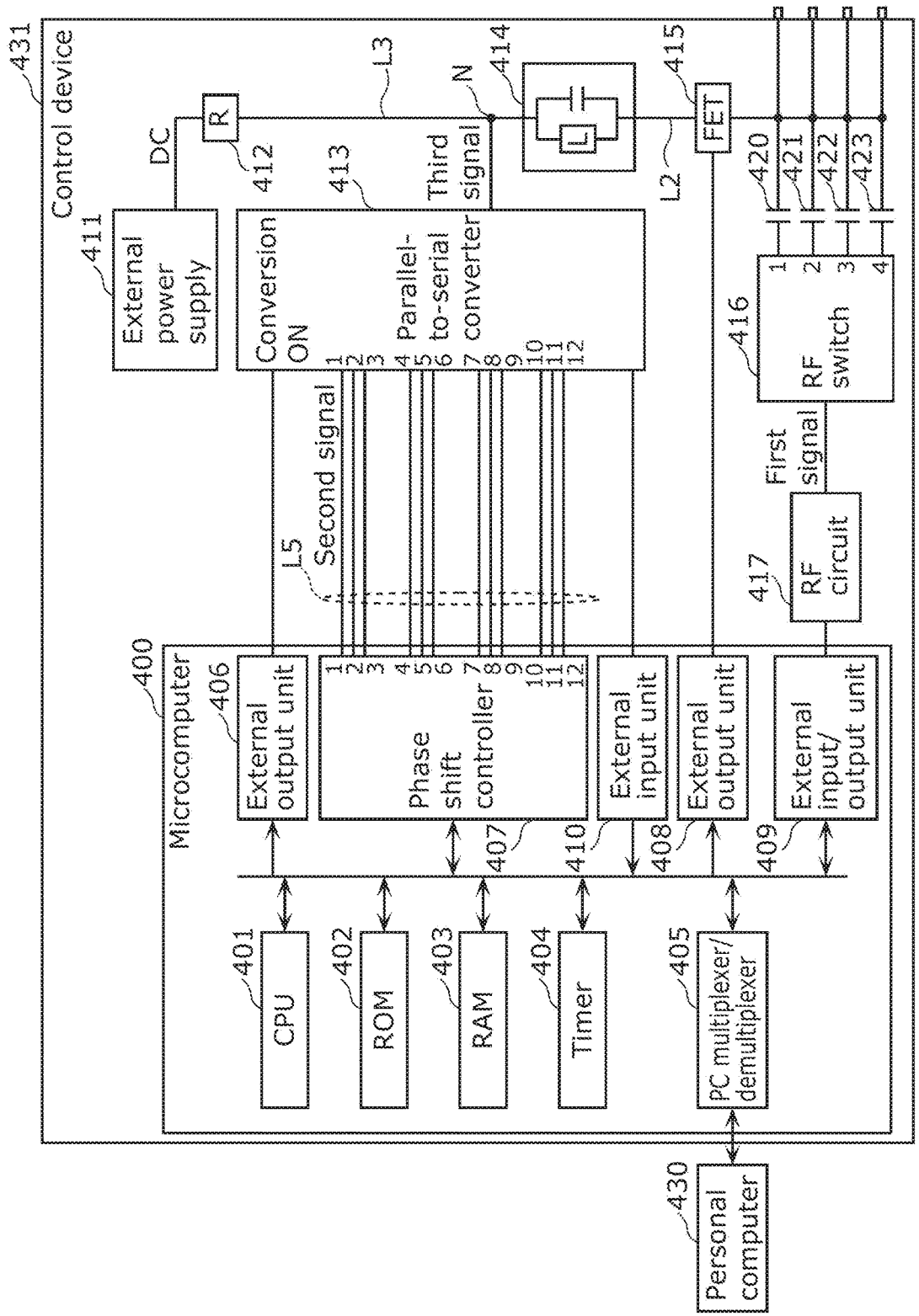
FIG. 8 is a configuration diagram illustrating an example of a control device according to Embodiment 4.

FIG. 8 is a configuration diagram illustrating an example of control device 431 according to Embodiment 4.

Control device 431 is different from control device 331 in Embodiment 3 in that microcomputer 400 further includes external output unit 408 and further includes field effect transistor (FET) 415. In other respects, control device 431 is basically the same as control device 331 in Embodiment 3, and thus the other respects will be omitted. Control device 431 need not include LC parallel resonance circuit 414. That is, control device 431 may have a configuration in which FET 415 is added to control device 271 according to Embodiment 1.

External output unit 408 is an interface which outputs a signal for controlling FET 415.

FET 415 is a second switch which is provided in second transmission path L2 and for blocking direct current from external power supply 411 to first transmission paths L1. FET 415 is, for example, a PchFET, its gate is connected to external output unit 408, its source is connected to first transmission path L1 side, and its drain is connected to external power supply 411 side. When a gate potential is made to be lower than a source potential by a signal from external output unit 408, FET 415 is brought into a conducting state (i.e., the direct current flows to first transmission path L1). When the gate potential is made to be higher than the source potential by a signal from external output unit 408, FET 415 is brought into a non-conducting state (i.e., the direct current does not flow to first transmission path L1).

For example, in an initial state (when a power supply of control device 431 is turned on), FET 415 is brought into the non-conducting state. This is for, for example, preventing the direct current from flowing into first transmission paths L1 unexpectedly even in a case where personal computer 430 is not configured to block the direct current.

Next, operation of control device 431 will be described with reference to FIG. 9.

Figure 9:
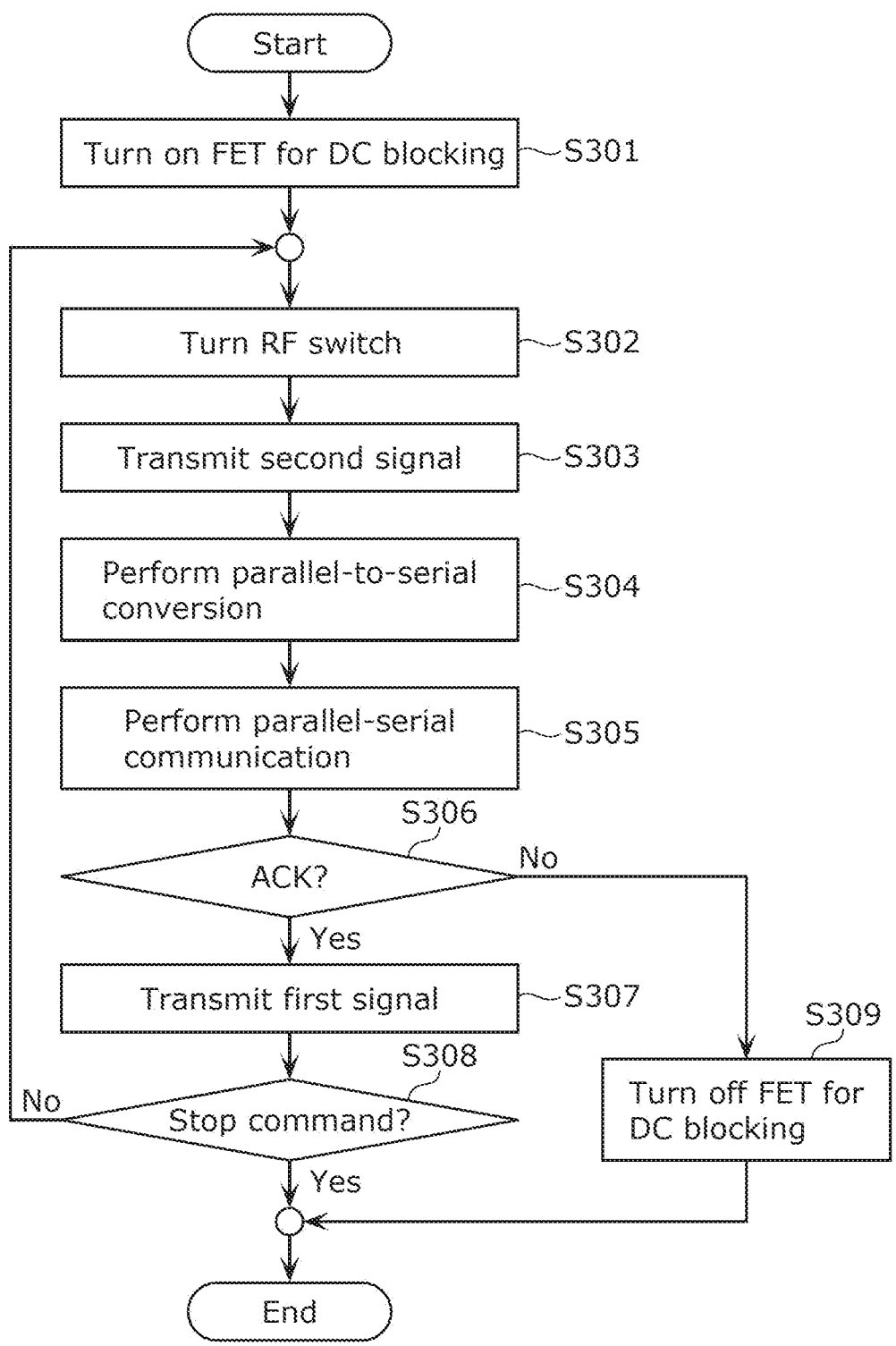
FIG. 9 is a flowchart illustrating an example of the operation of the control device according to Embodiment 4.

FIG. 9 is a flowchart illustrating an example of the operation of control device 431 according to Embodiment 4. FIG. 9 is a flowchart illustrating an example of the operation of control device 431 when a first signal and a second signal are to be transmitted after the power supply of control device 431 is turned on. Step S302 to step S308 are the same as step S201 to step S207 in Embodiment 1, and thus description of step S302 to step S308 will be omitted.

Control device 431 brings FET 415 for direct current blocking into the conducting state (step S301). This is because for example, when the power supply is turned on, FET 415 is in the non-conducting state, and it is therefore necessary to bring FET 415 into the conducting state for the serial decoders and the phase shifting devices included in the antennas connected to control device 431 (i.e., for performing the phase controlling and the like).

In a case where there is no ACK from any antenna within a predetermined time (No in step S306), control device 431 brings FET 415 for direct current blocking into the non-conducting state (step S309). In a case where no ACK has been returned, there is a possibility that the antennas connected to control device 431 include no decoders or the like having a function of returning ACK. In addition, since control device 431 is a device which outputs the first signal for controlling radio waves to be outputted from the antennas, control device 431 may be connected to a spectrum analyzer for measuring signal strength or connected to a network analyzer for impedance matching or the like. If direct current is supplied to such antennas, spectrum analyzer, or network analyzer, the direct current may destroy them. For these reasons, FET 415 is brought into the non-conducting state.

As described above, by providing FET 415 for blocking the direct current in second transmission path L2 between external power supply 411 and first transmission paths L1, it is possible to control FET 415 according to circumstances so as not to output the direct current from control device 431. This makes it possible to prevent the spectrum analyzer or the network analyzer, or an antenna that does not support supplying of direct current, or the like, from being destroyed even when one of them is connected to control device 431.

Note that the second switch for blocking the direct current from external power supply 411 to first transmission paths L1 may be implemented with an NchFET. Alternatively, the second switch may be implemented with a bipolar transistor or the like. Alternatively, the second switch may be implemented with a relay or the like.

[Embodiment 5]

Embodiment 5 will be described below with reference to FIG. 10 and FIG. 11.

Figure 10:
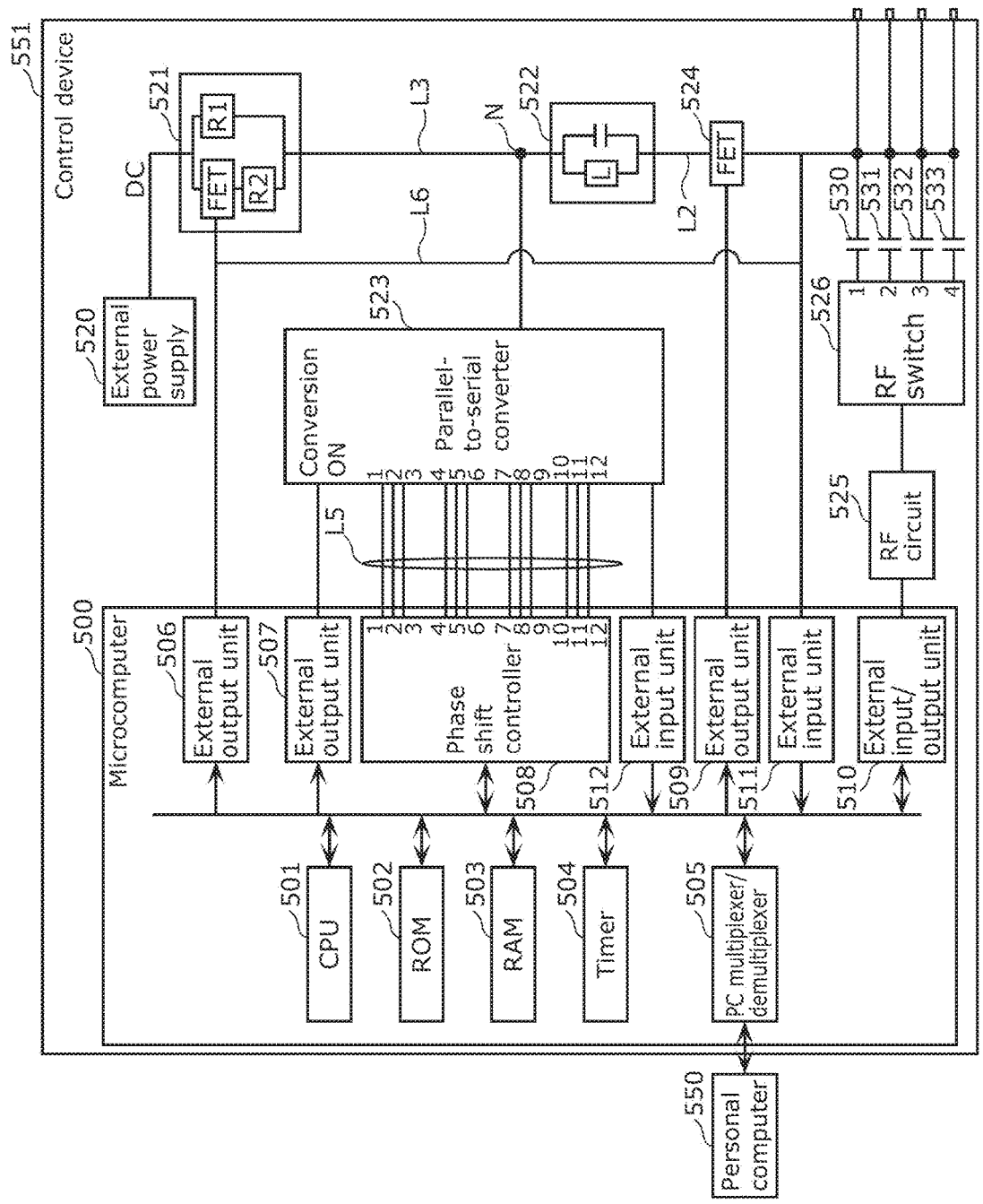
FIG. 10 is a configuration diagram illustrating an example of a control device according to Embodiment 5.

FIG. 10 is a configuration diagram illustrating an example of control device 551 according to Embodiment 5.

Control device 551 is different from control device 431 in Embodiment 4 in that microcomputer 500 further includes external output unit 506 and external input unit 511 and includes adjusting circuit 521 in place of resistor 412. In other respects, control device 551 is basically the same as control device 431 in Embodiment 4, and thus the other respects will be omitted. Control device 551 need not include at least one of LC parallel resonance circuit 522 and FET 524.

External output unit 506 is an interface which outputs a signal for controlling an FET in adjusting circuit 521.

External output unit 506 controls conduction and non-conduction of the FET in accordance with a voltage inputted into external input unit 511 to be described later.

External input unit 511 is an interface for measuring a value of direct current voltage of transmission paths L1. For example, microcomputer 500 includes an AD converting function and is capable of measuring a value of a voltage inputted into external input unit 511.

Adjusting circuit 521 is a circuit which is provided in third transmission path L3 and adjusts a value of the direct current supplied to second transmission path L2. Adjusting circuit 521 is a circuit with a parallel connection of a first resistor (indicated as R1) and a circuit in which an FET and a second resistor (indicated as R2) are connected in series to each other. For example, the first resistor has a resistance larger than the second resistor. The FET is, for example, a PchFET, its gate is connected to external output unit 506, its source is connected to the second resistor, and its drain is connected to external power supply 520. When a gate potential is made to be higher than a source potential by a signal from external output unit 506, FET 415 is brought into a non-conducting state. That is, adjusting circuit 521 has a resistance value of the first resistor. When the gate potential is made to be lower than the source potential by a signal from external output unit 506, the FET is brought into a conducting state. That is, the resistance value of adjusting circuit 521 becomes a parallel resistance value of the first resistor and the second resistor. Thus, when the FET is in the conducting state, the resistance value of adjusting circuit 521 is lower than that when the FET is in the non-conducting state, and the direct current supplied to first transmission paths L1 increases.

Note that, as illustrated in FIG. 10, the gate of the FET in adjusting circuit 521 and first transmission paths L1 may be connected by sixth transmission path L6. This is because, in a case where the direct current voltage of first transmission paths L1 drops, the gate potential of the FET also decreases through sixth transmission path L6, so that the FET can be controlled to decrease the resistance value of adjusting circuit 521, not under control by microcomputer 500.

Next, operation of control device 551 will be described with reference to FIG. 11.

Figure 11:
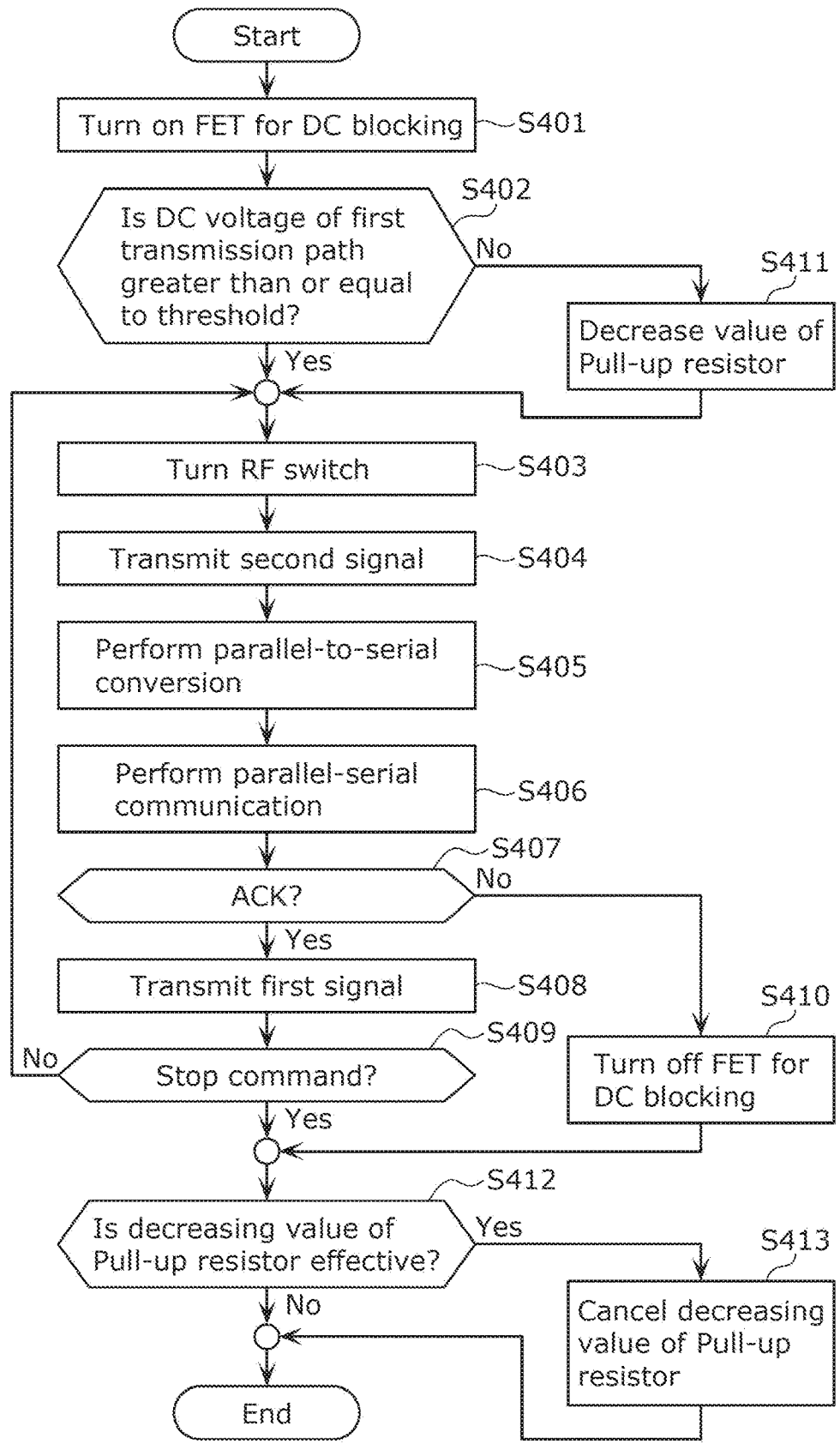
FIG. 11 is a flowchart illustrating an example of the operation of the control device according to Embodiment 5.

FIG. 11 is a flowchart illustrating an example of the operation of control device 551 according to Embodiment 5. Step S401 and step S403 to step S410 are the same as step S301 to step S309 in Embodiment 4, and thus description of step S401 and step S403 to step S410 will be omitted.

Control device 551 determines whether the direct current voltage of first transmission paths L1 is greater than or equal to a threshold (step S402). The determination can be made by, for example, microcomputer 500 monitoring the direct current voltage inputted into external input unit 511. For example, in a case where a parasitic capacitance of each first transmission path L1 is large or a case where an operation of increasing a load on the antennas connected to control device 551 is performed, the direct current to the antennas may become insufficient, reducing the direct current voltage of first transmission paths L1.

In a case where the direct current voltage of first transmission paths L1 is greater than or equal to the threshold (Yes in step S402), control device 551 does not decrease a value of a pull-up resistor, that is, control device 551 brings the FET in adjusting circuit 521 into the non-conducting state, and performs processing from step S403.

In a case where the direct current voltage of first transmission paths L1 is less than the threshold (No in step S402), control device 551 decreases the value of the pull-up resistor, that is, control device 551 brings the FET in adjusting circuit 521 into the conducting state to make the resistance value of adjusting circuit 521 less than that when the FET is in the non-conducting state (step S411). The direct current flowing into first transmission paths L1 can thus be increased.

Thereafter, after transmission of the first signal is finished, control device 551 determines whether a process of decreasing the value of the pull-up resistor is still effective (step S412).

In a case where the process of decreasing the value of the pull-up resistor is still effective (Yes in step S412), the process may be canceled (step S413). This is because there is a case where the value of the pull-up resistor need not be decreased depending on operating states of the antennas connected to control device 551 or the likes, and thus there is a case where the value of the pull-up resistor should not be decreased excessively in normal time from a viewpoint of current consumption or the like.

As described above, in the case where the parasitic capacitance of each first transmission path L1 is large or the case where the operation of increasing a load on the antennas is performed, the direct current to the antennas may become insufficient. Hence, by providing adjusting circuit 521, the direct current supplied to the antennas can be adjusted, and thus it is possible to increase the direct current to the antennas when the direct current to the antennas becomes insufficient.

[Embodiment 6]

Embodiment 6 will be described below with reference to FIG. 12 to FIG. 14.

Figure 12:
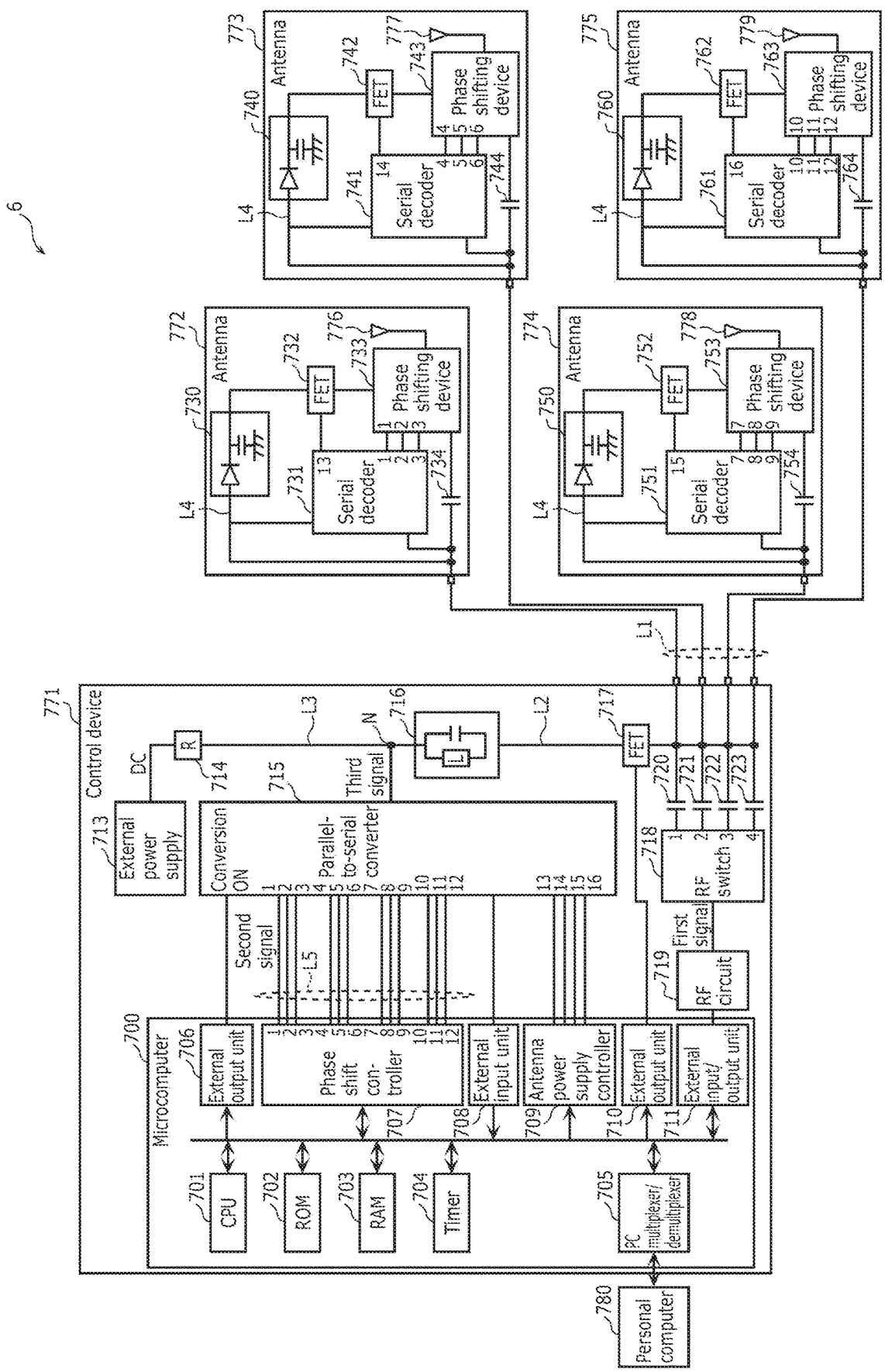
FIG. 12 is a configuration diagram illustrating an example of a transmission system according to Embodiment 6.

FIG. 12 is a configuration diagram illustrating an example of transmission system 6 according to Embodiment 6.

Control device 771 in transmission system 6 is different from control device 431 in Embodiment 4 in that microcomputer 700 further includes antenna power supply controller 709 and in that parallel-to-serial converter 715 acquires a signal from antenna power supply controller 709. In other respects, control device 771 is the same as control device 431 in Embodiment 4, and thus the other respects will be omitted.

Transmission system 6 includes, for example, a plurality of (e.g., four) antennas 772, 773, 774, and 775 and a plurality of (e.g., four) first transmission paths L1 to which the plurality of antennas 772, 773, 774, and 775 are connected in a one-to-one relationship. Hereinafter, what is referred to as an antenna means any one of the plurality of antennas 772, 773, 774, and 775.

Antenna power supply controller 709 outputs a signal indicating an antenna whose power supply is to be turned on among antennas 772 to 775. Parallel-to-serial converter 715 acquires the signal from antenna power supply controller 709 and converts a second signal additionally including the signal into a third signal. For example, numbers "13 to 16" attached to parallel-to-serial converter 715 are terminal numbers. For example, turning on or off of the power supply of antenna 772 is controlled by a signal transmitted to terminal "13". Similarly, turning on or off of the power supplies of antennas 773, 774, and 775 is controlled by signals transmitted to terminals "14", "15", and "16", respectively.

The plurality of antennas 772 to 775 each has the following configuration. Here, description will be made with attention paid to antenna 772. Antennas 773 to 775 have the same basic configuration as antenna 772, and thus detailed description will be omitted for antennas 773 to 775.

Antenna 772 includes phase shifting device 733, serial decoder 731, capacitor 734, antenna element 776, stabilizing power supply circuit 730, FET 732, and fourth transmission path L4. Phase shifting device 733, capacitor 734, and antenna element 776 are basically the same as phase shifting device 240, capacitor 260, and antenna element 276 in Embodiment 1, respectively, and thus description thereof will be omitted.

Fourth transmission path L4 is a transmission path for extracting the direct current from first transmission path L1 and supplying the direct current to phase shifting device 733. In the present embodiment, stabilizing power supply circuit 730 and FET 732 are provided in fourth transmission path L4.

Stabilizing power supply circuit 730 is a power supply circuit which is provided in fourth transmission path L4 and for supplying a constant direct current voltage to phase shifting device 733. Stabilizing power supply circuit 730 includes, for example, a diode and a capacitor, but a circuit configuration of stabilizing power supply circuit 730 is not limited to a specific configuration.

FET 732 is a blocking circuit which is provided in fourth transmission path L4 and for blocking the direct current to be supplied to phase shifting device 733. FET 732 is, for example, a PchFET, its gate is connected to serial decoder 731, its source is connected to phase shifting device 733, and its drain is connected to stabilizing power supply circuit 730. When a gate potential is made to be lower than a source potential by a fourth signal from serial decoder 731, FET 732 is brought into a conducting state (i.e., the direct current toward phase shifting device 733 is not blocked). When the gate potential is made to be higher than the source potential by a signal from serial decoder 731, FET 732 is brought into a non-conducting state (i.e., the direct current toward phase shifting device 733 is blocked).

Serial decoder 731 is a decoder which re-converts the third signal transmitted by first transmission path L1 into the fourth signal for parallel transmission. In a case where the fourth signal is a signal for antenna 772, serial decoder 731 send an ACK as with serial decoder 250 in Embodiment 1. Serial decoder 731 then parallel transmits the fourth signal to FET 732 and phase shifting device 733 to control supplying of the direct current to phase shifting device 733 by FET 732 and to control phase shifting by phase shifting device 733. For example, terminals "1 to 3" of each of serial decoder 731 and phase shifting device 733 correspond to terminals "1 to 3" of each of phase shift controller 707 and parallel-to-serial converter 715. Serial decoder 731 parallel transmits the fourth signal to terminals "1 to 3" of phase shifting device 733, as with the second signal which is outputted from terminals "1 to 3" of phase shift controller 707. In addition, for example, terminal "13" of serial decoder 731 corresponds to terminal "13" of parallel-to-serial converter 715. Serial decoder 731 controls FET 732 in accordance with a signal which is outputted from antenna power supply controller 709 to terminal "13" of parallel-to-serial converter 715. For example, in a case where the signal which is outputted to terminal "13" of parallel-to-serial converter 715 is a signal to provide an instruction to turn on the power supply of antenna 772, serial decoder 731 controls FET 732 such that FET 732 is in the conducting state. In addition, for example, in a case where the signal which is outputted to terminal "13" of parallel-to-serial converter 715 is a signal to provide an instruction to turn off power supply of antenna 772, serial decoder 731 controls FET 732 such that FET 732 is in the non-conducting state. In this way, in the present embodiment, turning on or off of power supplies of the antennas can be controlled.

Next, operation of control device 771 will be described with reference to FIG. 13.

Figure 13:
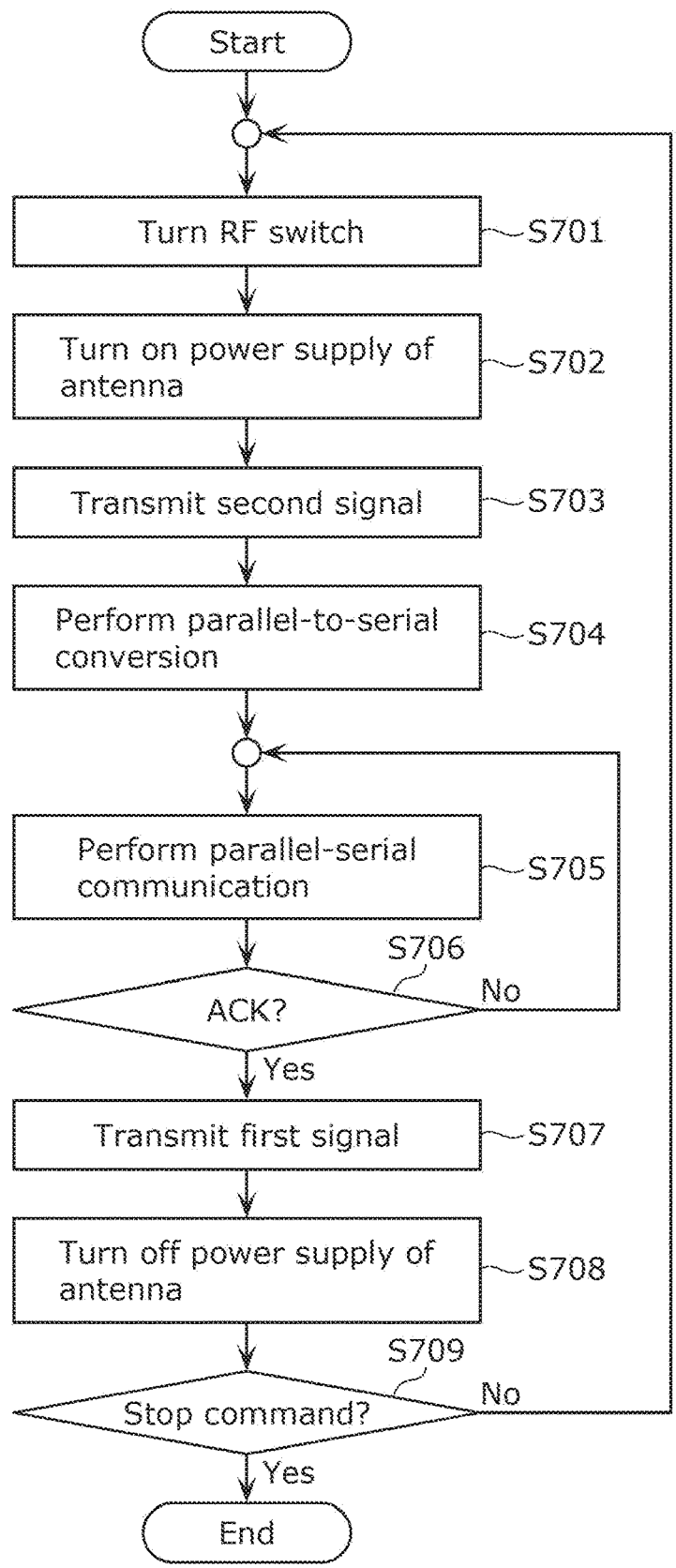
FIG. 13 is a flowchart illustrating an example of the operation of a control device according to Embodiment 6.

FIG. 13 is a flowchart illustrating an example of the operation of control device 771 according to Embodiment 6.

Control device 771 turns RF switch 718 (step S701). For example, to transmit the first signal to antenna 772, control device 771 controls RF switch 718 in such a manner as to connect RF circuit 719 to antenna 772 and not to connect RF circuit 719 to the other antennas.

Control device 771 turns on the power supply of antenna 772 (step S702). Specifically, control device 771 causes antenna power supply controller 709 to output a signal to provide an instruction to turn on the power supply of antenna 772 to cause serial decoder 731 of antenna 772 to bring FET 732 into the conducting state. Note that control device 771 turns off power supplies of antennas 773 to 775. For example, in a case where there is a plurality of antennas, when the antennas each demand a high direct current, the demand may exceed a value of current which can be supplied by external power supply 713. Hence, supplying of the direct current to phase shifting devices of antennas being not in use is stopped according to circumstances, so that the direct current can be prevented from becoming insufficient.

Step S703 to step S707 are the same as step S202 to step S206 in Embodiment 1, and thus description of step S703 to step S707 will be omitted.

Thereafter, after transmission of the first signal to antenna 772 is finished, control device 771 turns off the power supply of antenna 772 (step S708).

In a case where control device 771 has not received a stop command (No in step S709), control device 771 performs processing again from step S701. For example, control device 771 turns RF switch 718 to turn on a power supply of an antenna other than antenna 772, and then performs the same processing on the antenna other than antenna 772.

In a case where control device 771 receives the stop command (Yes in step S709), control device 771 ends the processing.

In a case where transmission system 6 includes a plurality of sets of an antenna and first transmission path L1 connected to the antenna, in a case where transmission system 6 controls the plurality of antennas individually, it is necessary to recognize which of the antennas is connected to which first switch of a plurality of first switches of RF switch 718. For example, it is conceivable to check a connection relationship manually, but the check is troublesome. Hence, control device 771 may further include a pairing process unit which, when transmission of the first signal is being controlled by one first switch among the plurality of first switches, pairs the one first switch and an antenna having a received signal strength indication greater than or equal to a predetermined threshold among the plurality of antennas. Note that the pairing process unit is implemented by microcomputer 700 or the like. Processing of pairing an antenna and a first switch will be described with reference to FIG. 14. Assume that each of the antennas is assigned a specific ID in advance. That is, each antenna is assumed to include a memory (not illustrated), which stores the specific ID in advance. In addition, each antenna is to be subjected to predetermined phase controlling. That is, a direction of high directivity strength is assumed to be determined for each antenna in advance. In addition, assume that an RFID tag is disposed in a direction in which each antenna has a high directivity strength and that control device 771 can acquire a received signal strength indication (RSSI) from the RFID tag.

Figure 14:
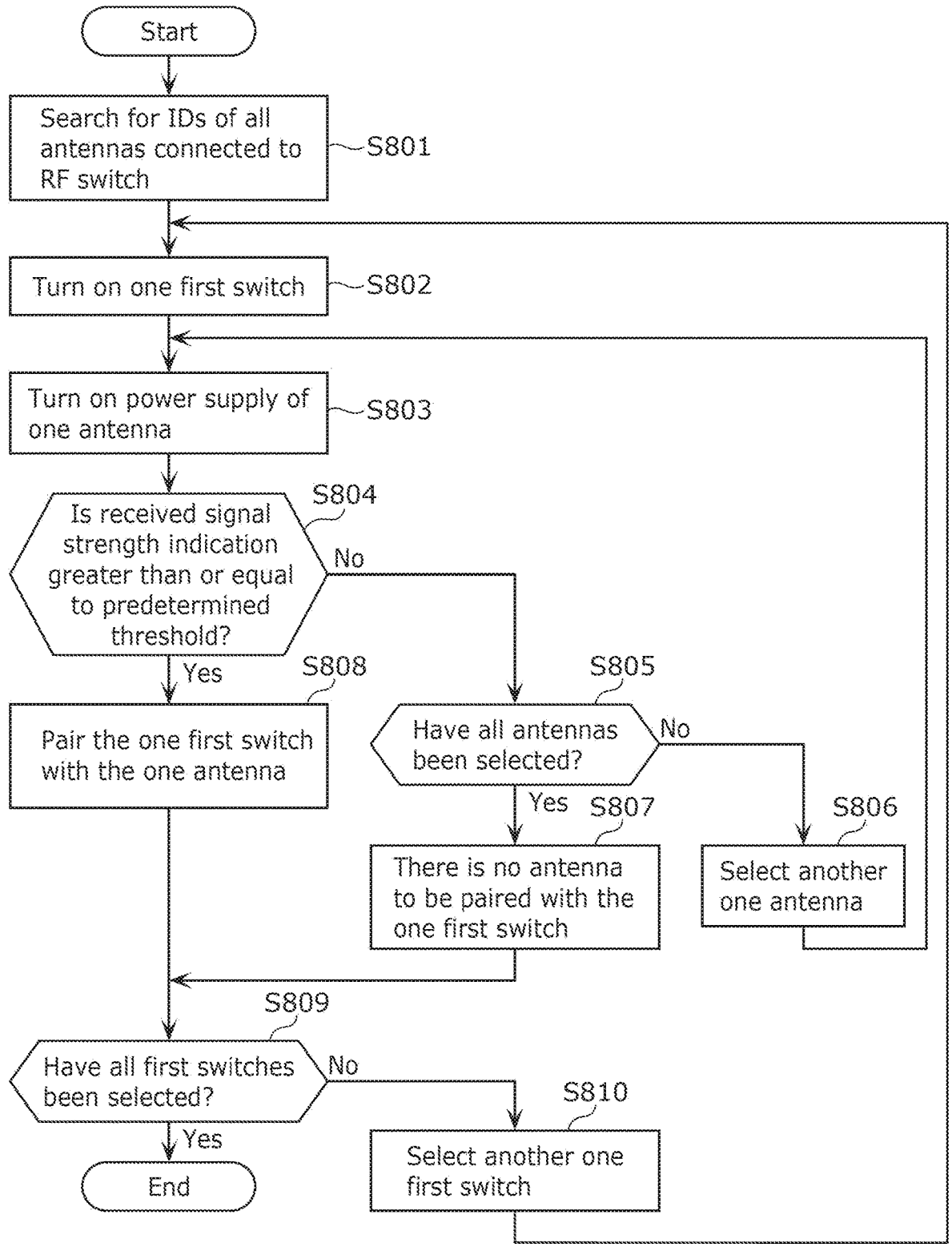
FIG. 14 is a flowchart illustrating an example of the operation of pairing by the control device according to Embodiment 6.

FIG. 14 is a flowchart illustrating an example of the operation of pairing by control device 771 according to Embodiment 6.

Control device 771 searches for IDs of all the antennas connected to RF switch 718 (in other words, connected to first transmission paths L1) (step S801). Specifically, control device 771 outputs an instruction to cause all the antennas to return their specific IDs which the antennas store in advance, to the plurality of first transmission paths L1. This causes the antennas to return the specific IDs stored therein, by which control device 771 can recognize what IDs are assigned to antennas which are present in the plurality of first transmission paths L1. Assume here that four antennas are present and that control device 771 has recognized four IDs.

Control device 771 turns on one first switch among the plurality of first switches (step S802). In this case, RF switch 718 includes four first switches corresponding to four first transmission paths L1, and control device 771 turns on one first switch among the four first switches. In addition, control device 771 causes RF circuit 719 to output the first signal. This causes an antenna which is connected to the one first switch to output a radio wave as long as a power supply of the antenna connected to the one first switch has been turned on, so that a received signal strength indication from the RFID tag is high. In other words, even if a power supply of an antenna which is not connected to the one first switch has been turned on, no radio wave is outputted from the antenna not connected to the one first switch, and the received signal strength indication from the RFID tag is low.

Control device 771 turns on a power supply of one antenna among the plurality of antennas (step S803). Specifically, control device 771 designates one ID among the IDs of all the antennas which have been recognized in step S801 and turns on a power supply of only one antenna which corresponds to the ID.

Control device 771 determines whether the received signal strength indication from the RFID tag is greater than or equal to a predetermined threshold (step S804). The received signal strength indication from the RFID tag being greater than or equal to the predetermined threshold (i.e., the received signal strength indication being high) means that the first signal is transmitted to the one antenna being currently turned on via the one first switch being currently turned on and that the one first switch and the one antenna are in a connection relationship. In contrast, the received signal strength indication from the RFID tag being less than the predetermined threshold (i.e., the received signal strength indication being low) means that the first signal is not transmitted to the one antenna being currently turned on via the one first switch being currently turned on and that the one first switch and the one antenna are not in a connection relationship.

In a case where the received signal strength indication from the RFID tag is less than the predetermined threshold (No in step S804), control device 771 determines whether all the antennas have been selected (step S805). After recognizing the four IDs in step S801, control device 771 selects one antenna which stores one ID among the IDs and turns on a power supply of the one antenna in step S803. Therefore, control device 771 has not selected all the antennas (No in step S805); control device 771 thus selects another one antenna among the plurality of antennas (step S806) and performs processing of step S803 and step S804.

For example, in a case where the received signal strength indication from the RFID tag has not been greater than nor equal to the predetermined threshold although the processing of step S803 and step S804 has been performed on all the antennas (Yes in step S805), control device 771 determines that there is no antenna which can be paired with the one first switch being currently turned on (step S807) and pairs no antenna with the one first switch.

In contrast, in a case where the received signal strength indication from the RFID tag is greater than or equal to the predetermined threshold (Yes in step S804), control device 771 pairs the one first switch being currently turned on and the one antenna being currently turned on (specifically, the ID stored in the one antenna) (step S808). This thereafter makes it possible to control the one antenna individually via the one first switch.

After pairing the one antenna with the one first switch being currently turned on or determining that there is no antenna which can be paired with the one first switch, control device 771 determines whether all the first switches have been selected (step S809). Control device 771 turns on one first switch among the four first switches in step S802 but has not turned on the other first switches. Accordingly, control device 771 has not selected all the first switches (No in step S809); control device 771 thus selects another one first switch among the four first switches (step S810) and performs processing of step S802 and subsequent steps. That is, the processing of pairing an antenna is performed on all the first switches as described above.

Then, when control device 771 selects all the first switches and completes the processing of pairing an antenna (Yes in step S809), control device 771 ends the processing of pairing.

As described above, when transmission of the first signal is being controlled by one first switch among the plurality of first switches, the one first switch is automatically paired with an antenna having a received signal strength indication greater than or equal to the predetermined threshold among the plurality of antennas. This is because the antenna having a received signal strength indication greater than or equal to the predetermined threshold is an antenna to which the first signal is transmitted via the one first switch, and thus it is found that the antenna is connected to the one first switch. By similarly pairing each of the other first switches with an antenna which has a received signal strength indication greater than or equal to the predetermined threshold when transmission of the first signal is controlled by the other first switch, the plurality of antennas and the plurality of first switches can be paired with one another. In this way, the pairing of the plurality of antennas and the plurality of first switches can be easily performed.

(Other Embodiments)

Although a transmission system, an antenna, and a control device according to the present disclosure has been described based on exemplary embodiments, the present disclosure is not limited to the foregoing exemplary embodiments. Forms obtained by various modifications to the foregoing embodiments conceived by a person of ordinary skill in the art as well as forms implemented by combining structural components of different embodiments, so long as they do not depart from the spirit of the present disclosure are included in the scope of the present disclosure.

For example, although the transmission system in the embodiments described above includes a plurality of sets of an antenna and first transmission path L1, the transmission system may include a single set of an antenna and first transmission path L1.

In addition, for example, although the antennas in the embodiments described above each include the phase shifting device as an output unit for outputting a radio wave, this is not construed as limiting the antennas. For example, the antenna may each include, as the output unit, a switch for selecting one antenna element among a plurality of antenna elements which form an antenna array.

In addition, for example, although the serial decoder or the decoder in the embodiments described above has a function of responding with the acknowledgment, the serial decoder or the decoder need not have that function.

For example, although the transmission system in the embodiments described above has a configuration for controlling shifting of a phase of a radio wave outputted from an antenna, the transmission system need not have the configuration. For example, the transmission system need not include the parallel-to-serial converter and the serial decoder nor the parallel-to-pulse converter, the pulse counter, and the decoder, and in addition, the transmission system need not include the phase shifting device. In this case, first transmission paths L1 are used for transmission of the first signal and supplying of the direct current to the antennas but need not be used for transmission of the third signal. In addition, in this case, the antennas need not form an antenna array.

It should be noted that the present disclosure can be implemented not only as a transmission system or a control device but also as a transmission method including the steps (processes) performed by the respective structural components included in the transmission system or the control device.

Specifically, the transmission method is transmission method used in a transmission system including an antenna and a control device including a radio wave controller which transmits a first signal for controlling a radio wave to be outputted from the antenna and a direct current power supply which supplies direct current to the antenna, the transmission method including the steps illustrated in FIG. 4. Transmission of the first signal to the antenna and supplying of the direct current to the antenna are performed using a first transmission path connecting the antenna and the control device.

For example, steps included in the transmission method may be implemented by a computer (computer system). In addition, the present disclosure can be implemented as a program for causing to execute the steps included in the transmission method. Moreover, the present invention can be implemented as a non-transitory computer-readable recording medium, such as a CD-ROM, on which the program is recorded.

For example, when the present disclosure is implemented as a program (software), the respective steps are executed by the program being executed using hardware resources such as a CPU, memory, input/output circuit, and so on, of the computer. Specifically, the respective steps are executed by the CPU obtaining data from the memory or input/output circuit and performing an operation, and outputting the operation result to the memory or the input/output circuit.

Furthermore, the respective structural components included in the transmission system in the forgoing embodiments may be implemented as dedicated or general-purpose circuits.

Furthermore, the respective structural components included in the transmission system in the forgoing embodiments may be implemented as a large-scale integration (LSI) which is an integrated circuit (IC).

Furthermore, such IC is not limited to an LSI, and may be implemented as a dedicated circuit or a general-purpose processor.

Alternatively, a field programmable gate array (FPGA) that allows for programming after the manufacture of an LSI, or a reconfigurable processor that allows for reconfiguration of the connection and the setting of circuit cells inside an LSI may be employed.

Furthermore, when a circuit integration technology that replaces LSIs comes along owing to advances in semiconductor technology or to a separate derivative technology, the respective structural elements included in the transmission system may be integrated using such technology.

INDUSTRIAL APPLICABILITY

The present disclosure can be used in a system and the like which performs reading and writing of RFID using an antenna.

The invention claimed is:
1. A transmission system, comprising:
an antenna;
a control device including:
a radio wave controller which transmits a first signal for controlling a radio wave to be outputted from the antenna;
a phase shift controller which performs parallel transmission of a second signal for controlling phase shifting of a radio wave to be outputted by the antenna; and
a converter which converts the second signal that has been parallel transmitted into a third signal; and
a first transmission path which connects the antenna and the control device, and is used in transmission of the first signal to the antenna,
wherein the first transmission path is also used in transmission of the third signal to the antenna.
2. The transmission system according to claim 1, further comprising:
a first switch which controls the transmission of the first signal by the first transmission path.
3. The transmission system according to claim 1, comprising:
a plurality of antennas and a plurality of first transmission paths, each of the plurality of antennas being the antenna, each of the plurality of first transmission paths being the first transmission path, wherein
the first signal is a signal for controlling radio waves to be outputted from the plurality of antennas, and
the second signal is a signal for controlling phase shifting of the radio waves to be outputted by the plurality of antennas.
4. The transmission system according to claim 3, further comprising:
a plurality of first switches which control transmission of the first signal by the plurality of first transmission paths, wherein
the control device further includes:
a pairing process unit which, when transmission of the first signal is being controlled by one first switch among the plurality of first switches, pairs the one first switch and an antenna having a received signal strength indication greater than or equal to a predetermined threshold among the plurality of antennas.
5. The transmission system according to claim 1, further comprising:
a second transmission path for transmitting the third signal obtained from the conversion by the converter to the first transmission path.

6. The transmission system according to claim 1, further comprising:
a second transmission path for transmitting the third signal obtained from the conversion by the converter to the first transmission path; and
an LC parallel resonance circuit provided in the second transmission path.

7. The transmission system according to claim 1, wherein the converter is a parallel-to-serial converter, and
the third signal is a serial signal.

8. The transmission system according to claim 7, wherein the antenna further includes a serial decoder which re-converts the third signal transmitted by the first transmission path into a fourth signal for parallel transmission, and responds with an acknowledgment when the fourth signal is a signal for the antenna.

9. The transmission system according to claim 1, wherein the converter is a parallel-to-pulse converter, and
the third signal is a pulse signal.

10. The transmission system according to claim 9, wherein the antenna further includes:
a pulse counter which counts a total number of pulses of the third signal transmitted by the first transmission path; and
a decoder which re-converts the third signal into a fourth signal for parallel transmission, based on the total number of pulses counted by the pulse counter, and responds with an acknowledgment when the fourth signal is a signal for the antenna.

11. The transmission system according to claim 8, further comprising:
a control unit that instructs the antenna to output a radio wave when the acknowledgment is received within a predetermined time, and instructs the phase shift controller to send the second signal again when the acknowledgment is not received within the predetermined time.

12. The transmission system according to claim 1, wherein the antenna further includes a phase shifter for outputting a radio wave.

13. An antenna used in a transmission system, the transmission system comprising:
the antenna;
a control device including:
a radio wave controller which transmits a first signal for controlling a radio wave to be outputted from the antenna;
a phase shift controller which performs parallel transmission of a second signal for controlling phase shifting of a radio wave to be outputted by the antenna; and
a converter which converts the second signal that has been parallel transmitted into a third signal; and
a first transmission path which connects the antenna and the control device, and is used in transmission of the first signal to the antenna,
wherein the first transmission path is also used in transmission of the third signal to the antenna.

14. A control device used in a transmission system, the transmission system comprising:
an antenna;
the control device including:
a radio wave controller which transmits a first signal for controlling a radio wave to be outputted from the antenna;
a phase shift controller which performs parallel transmission of a second signal for controlling phase shifting of a radio wave to be outputted by the antenna; and
a converter which converts the second signal that has been parallel transmitted into a third signal; and
a first transmission path which connects the antenna and the control device, and is used in transmission of the first signal to the antenna,
wherein the first transmission path is also used in transmission of the third signal to the antenna.

15. A transmission method used in a transmission system including an antenna and a control device, the control device including (i) a radio wave controller which transmits a first signal for controlling a radio wave to be outputted from the antenna, (ii) a phase shift controller which performs parallel transmission of a second signal for controlling phase shifting of a radio wave to be outputted by the antenna, and (iii) a converter which converts the second signal that has been parallel transmitted into a third signal, the transmission method comprising:
performing transmission of the first signal to the antenna, using a first transmission path connecting the antenna and the control device; and
performing transmission of the third signal to the antenna using the first transmission path.

* * * * *